United States Patent
Buckland et al.

(10) Patent No.: US 10,895,197 B2
(45) Date of Patent: Jan. 19, 2021

(54) SYSTEM AND METHOD FOR BOOST CONTROL

(71) Applicant: Ford Global Technologies, LLC, Dearborn, MI (US)

(72) Inventors: Julia Helen Buckland, Commerce Township, MI (US); Baitao Xiao, Canton, MI (US); Tyler Kelly, Plymouth, MI (US); David Bell, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 395 days.

(21) Appl. No.: 15/878,915

(22) Filed: Jan. 24, 2018

(65) Prior Publication Data
US 2019/0226391 A1 Jul. 25, 2019

(51) Int. Cl.
| | |
|---|---|
| *F02B 37/14* | (2006.01) |
| *F02B 37/10* | (2006.01) |
| *F02B 37/18* | (2006.01) |
| *F02B 39/10* | (2006.01) |
| *F02B 37/16* | (2006.01) |
| *F02B 37/12* | (2006.01) |

(52) U.S. Cl.
CPC ............. *F02B 37/14* (2013.01); *F02B 37/10* (2013.01); *F02B 37/16* (2013.01); *F02B 37/18* (2013.01); *F02B 39/10* (2013.01); *F02B 2037/125* (2013.01)

(58) Field of Classification Search
CPC .......... F02B 37/14; F02B 37/10; F02B 37/18; F02B 39/10; F02B 37/16; F02B 2037/125; F02B 37/12; Y02T 10/12
See application file for complete search history.

(56) References Cited

U.S. PATENT DOCUMENTS

| | | | |
|---|---|---|---|
| 7,779,634 B2 | 8/2010 | Barthelet et al. | |
| 7,992,389 B2 | 8/2011 | Furman et al. | |
| 9,174,637 B2 | 11/2015 | Banker | |
| 9,726,092 B2 | 8/2017 | Xiao et al. | |
| 2008/0282699 A1 | 11/2008 | Barthelet et al. | |
| 2017/0349164 A1 | 12/2017 | Miller et al. | |

FOREIGN PATENT DOCUMENTS

WO 2005064136 A1 7/2005

OTHER PUBLICATIONS

Xiao, B. et al., "Method and System For a Boosted Engine," U.S. Appl. No. 15/693,038, filed Aug. 31, 2017, 71 pages.
Xiao, B. et al., "Method and System For a Boosted Engine," U.S. Appl. No. 15/693,125, filed Aug. 31, 2017, 73 pages.
McConville, G. et al., "System and Method for Boost Control," U.S. Appl. No. 15/878,865, filed Jan. 24, 2018, 66 pages.

*Primary Examiner* — Audrey K Bradley
*Assistant Examiner* — Edward Bushard
(74) *Attorney, Agent, or Firm* — Geoffrey Brumbaugh; McCoy Russell LLP

(57) ABSTRACT

Methods and systems are provided for improving surge control in a boosted engine system configured with an electric motor to provide electrical boost assistance. Tip-in and tip-out surge are addressed by increasing the opening of a compressor recirculation valve and coordinating the recirculation valve opening with adjustments to an exhaust waste-gate position and a power output by the electric motor. The adjustments enable an intake airflow to be provided that operates the compressor outside a surge region while providing a target boost pressure as operator torque demand increases or decreases.

9 Claims, 7 Drawing Sheets

SYSTEM AND METHOD FOR BOOST CONTROL

FIELD

The present description relates generally to methods and systems for coordinated control of an electrically assisted turbocharger and a continuously variable recirculation valve (CCRV).

BACKGROUND/SUMMARY

Engine systems may be configured with boosting devices, such as turbochargers or superchargers, for providing a boosted aircharge and improving peak power outputs. The use of a compressor allows a smaller displacement engine to provide as much power as a larger displacement engine, but with additional fuel economy benefits. Turbochargers, however, suffer from turbo lag. Since the compressor speed depends on the speed with which a turbine can be spooled up, during a transient increase in torque demand, there may be a lag between when the boost pressure is demanded and when it is delivered.

The transient response of the boosted engine can be improved by adding electric assist to the turbocharger. One example of a boosted engine system configured with electric assist is shown by Barthelet et al in U.S. Pat. No. 7,779,634. Therein an electric motor can drive a turbocharger shaft coupling an exhaust turbine to an intake compressor. By adjusting the motor output when there is an increase in torque demand, boost response can be improved while the turbine spools up.

However the inventors herein have identified potential issues with such an approach for boost control. As one example, the electric assist can cause boost pressure overshoot. Specifically, if the electric assist is aggressively controlled to achieve a fast response time, the high inertia of the electric motor can cause the actual boost pressure to overshoot the desired boost pressure. This can cause the compressor to enter a surge region, reducing forward flow through the compressor. In addition, surge related NVH issues, such as undesirable noise from the engine intake system, can occur. Even if the compressor is not operating at or near the surge region, the overshoot can cause the compressor to exceed a speed limit, or a boost limit, degrading compressor life. Further, the overshoot can result in undesirable interaction with throttle control due to non-minimum phase (NMP) behavior. If the electric assist is detuned to reduce overshoot, the transient boost response is degraded. In some examples, the electric motor can be shifted to a generator mode to apply regenerative torque (that is, a negative torque) during the overshoot condition. However, it may be difficult to precisely control the timing of when to operate the electric motor for motoring versus generating as a function of boost pressure. In addition, the negative torque may be wasted if a battery coupled to the electric motor is unable to receive the generated charge (such as when the battery is already fully charged).

In one example, some of the above issues may be addressed by a method for a boosted engine, comprising: responsive to predicted boost overshoot, adjusting each of a regenerative torque output by an electric motor coupled to a booting device and an opening of a continuously variable compressor recirculation valve (CCRV), the adjusting based on a state of charge (SOC) of a battery coupled to the electric motor. In this way, electric assistance can be used to improve boost response while reducing boost overshoot and associated issues.

As one example, a boosted engine may be configured with a turbocharger having an intake compressor driven by an exhaust turbine, and an electric motor coupled to the turbocharger, such as to the turbocharger shaft. In response to an increase in torque demand, a controller may operate the electric motor to provide electric boost assistance. The operation of the electric motor may be coordinated with the opening of a waste-gate coupled across an exhaust turbine and a continuously variable compressor recirculation valve (CCRV) coupled across the intake compressor to meet the boost pressure demand. For example, while operating the electric motor more aggressively, the waste-gate opening may be decreased to expedite turbine spin-up, while the CCRV opening is increased to improve the margin to surge. If a boost pressure overshoot is expected, the controller may take actions to reduce the overshoot, the actions selected based on the ability of the boosted engine system to accept charge derived from the boost overshoot. Specifically, if a battery state of charge (SOC) is lower than a threshold charge, the controller may transition to extract torque from the turbocharger by operating the electric motor as a generator before the target boost pressure is reached so as to reduce the boost overshoot and charge the battery using the applied regenerative (or negative) torque. In addition, the opening of the waste-gate and CCRV may be coordinated with the regenerative torque provided by the motor. For example, the opening of both the waste-gate and the CCRV may be increased (e.g., to reduce any boost overshoot remaining after regenerative torque application). Else, if the battery SOC is higher than the threshold charge, the controller may continue operating the electric motor in the motoring mode, but less aggressively, while increasing the opening of the CCRV based on the pressure differential (between the desired boost pressure and the actual boost pressure with the electric assist enabled). For example, the CCRV may be shifted to a fully open position.

It will be appreciated that while the above example is described with reference to an engine system where the boosting device is a turbocharger, in alternate examples, the boosting device may be an electric supercharger and the adjustments may be performed via an electric motor coupled to the supercharger compressor.

In this way, the operation of a compressor recirculation valve may be coordinated with the amount of electric motor torque provided to a turbocharger (e.g., a turbocharger shaft) to improve boost pressure control and responsiveness. In particular, boost pressure overshoot maybe reduced while concurrently increasing a margin to surge by opening a CCRV coupled across an intake compressor while disabling the supply of electric power to an electric motor coupled to the turbocharger shaft, or by extracting power from the electric motor, thereby slowing the turbocharger shaft. The technical effect of increasing the opening of the CCRV while providing negative torque from an electric assist motor more aggressively when a battery is capable of accepting charge or while disabling the electric assist motor when the battery is not capable of accepting charge is that a faster boost response can be provided. By relying on an electric motor coupled to a turbocharger, the same motor can be used for improving boost control during a tip-in event by adding torque to a turbocharger shaft when actual boost is below demanded boost, and by subtracting torque from the turbocharger shaft to charge a battery when actual is predicted to exceed the demanded boost. Overall, boosted engine performance is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
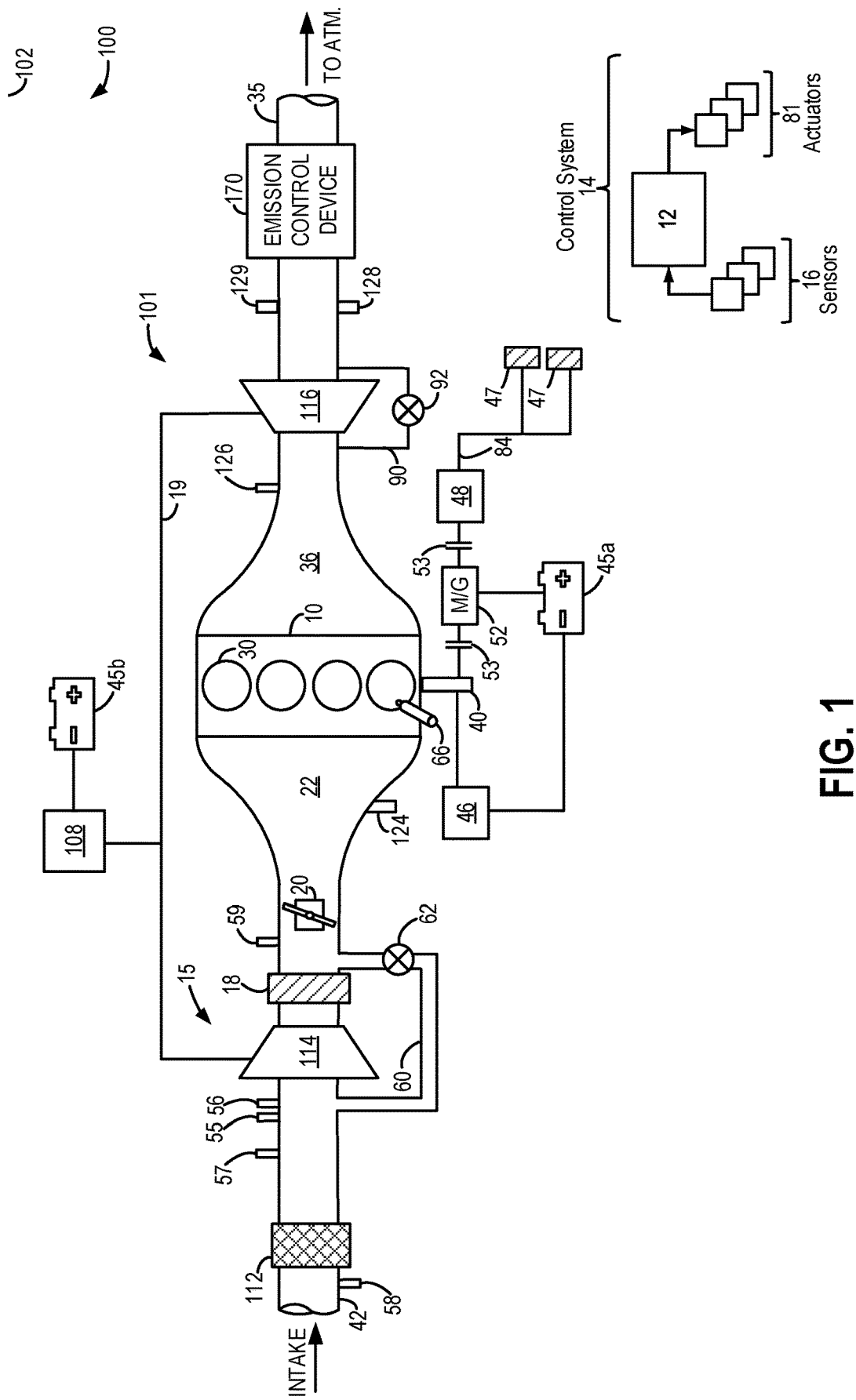
FIG. 1 shows an example embodiment of a boosted engine system configured with an electric motor for providing electric boost assistance.
Figure 3:
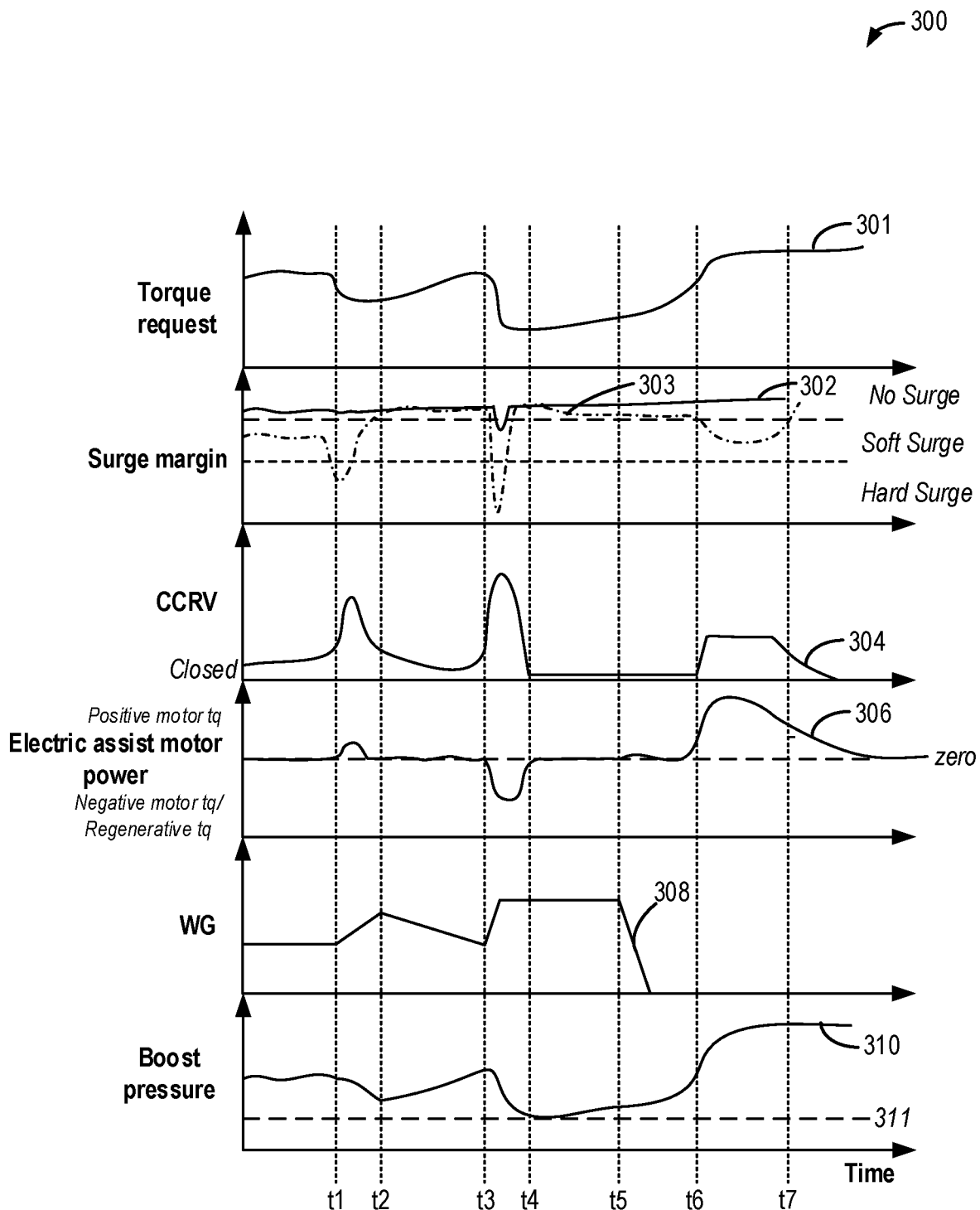
FIG. 3 depicts a prophetic example of coordinated actuation of a continuously variable compressor recirculation valve with torque delivery from an electric assist motor.
Figure 4:
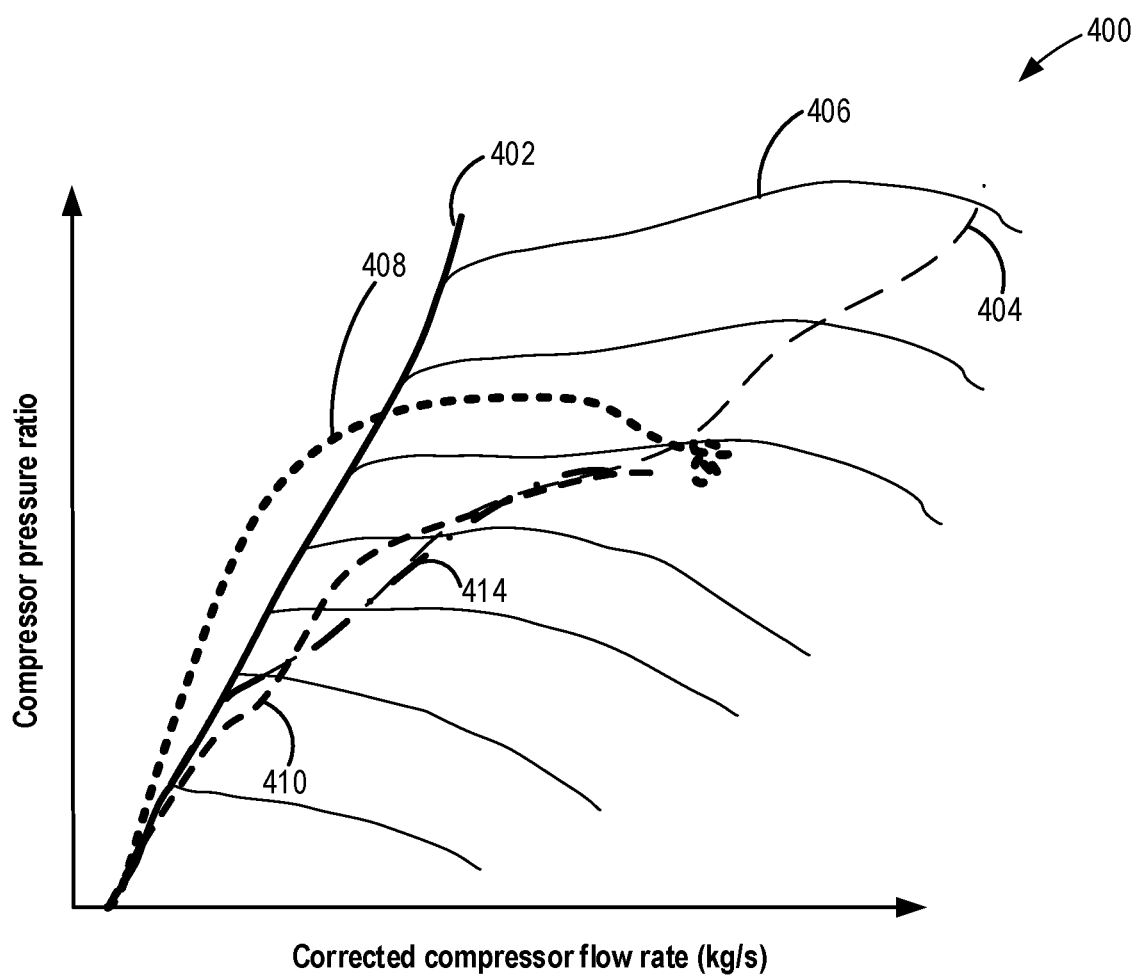
FIG. 4 shows an example movement of an operating point of a compressor coupled to an electric motor on a compressor map relative to a surge region of the map.
Figure 6:
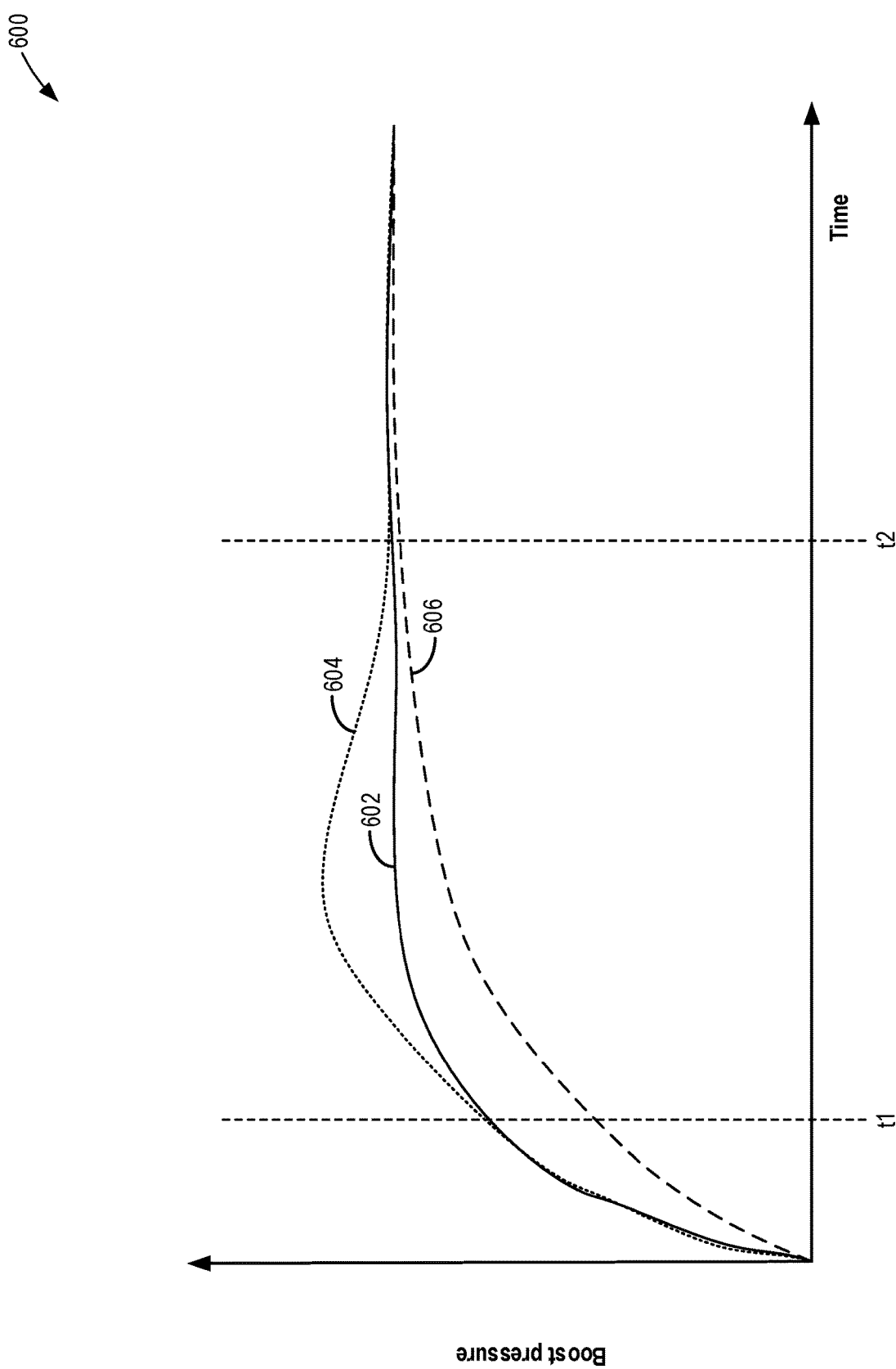
FIG. 6 shows an example boost pressure ratio map depicting boost pressure control via an electric motor.
Figure 7:
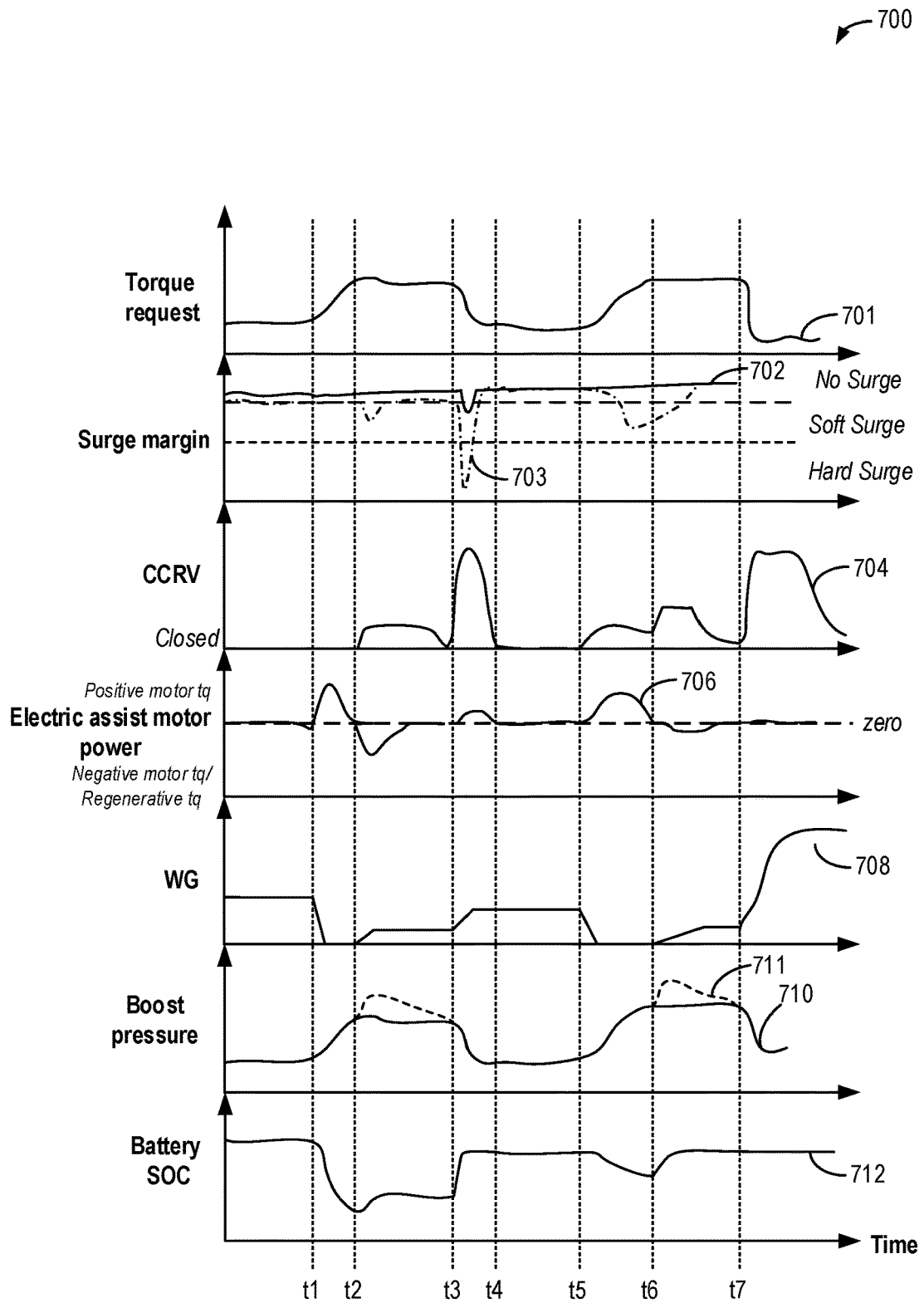
FIG. 7 depicts another prophetic example of coordinated actuation of a continuously variable compressor recirculation valve with torque delivery from an electric assist motor.

The following description relates to systems and methods for improving boost pressure control and a margin to surge in a hybrid vehicle system having an engine with a boosting device that is configured with electric assistance from an electric motor. One non-limiting example of such a system is shown in FIG. 1, wherein an electric turbocharger is provided in a hybrid electric vehicle. An engine controller may be configured to perform a control routine, such as the example routine of FIG. 2, to address surge by coordinating the actuation of a compressor recirculation valve with adjustments to a waste-gate valve and electric boost assistance provided by the electric motor. A prophetic example of coordinating electric assist motor and CCRV operation responsive to surge is shown in FIG. 3. An example movement of the compressor pressure ratio relative to a surge region of a compressor map responsive to the CCRV and electric motor actuation is shown at FIG. 4. The engine controller may be further configured to perform a control routine, such as the example routine of FIG. 5, to reduce boost pressure overshoot by coordinating the actuation of the CCRV with adjustments to torque delivered from the electric assist motor. A prophetic example of coordinating electric assist motor and CCRV operation to reduce boost pressure overshoot is shown in FIG. 7. An example change in a compressor pressure ratio responsive to the CCRV and electric motor actuation during overshoot reduction is shown at FIG. 6.

FIG. 1 schematically shows aspects of an example vehicle system 100, including an engine system 101 having an engine 10 coupled in a vehicle 102. In the depicted example, vehicle 102 is a hybrid electric vehicle with multiple sources of torque available to one or more vehicle wheels 47. However in alternate examples, vehicle system 100 may include a conventional non-hybrid powertrain. In the example shown, a powertrain of vehicle 102 includes engine 10 and an electric machine 52. Electric machine 52 may be a motor or a motor/generator. Engine 10 and electric machine 52 are connected to vehicle wheels 47 via a transmission 48 when one or more clutches 53 are engaged. In the depicted example, a (first) clutch 53 is provided between engine 10 and electric machine 52, and a (second) clutch 53 is provided between electric machine 52 and transmission 48. A controller 12 may send a signal to an actuator of each clutch 53 to engage or disengage the clutch, thereby connecting or disconnecting engine 10 from electric machine 52 and the components connected thereto and/or connecting or disconnecting electric machine 52 from transmission 48 and the components connected thereto. For example, torque from engine 10 may be transferred to vehicle wheels 47 via a crankshaft 40, transmission 48, and a powertrain shaft 84 when clutches 53 are engaged. Transmission 48 may be a gearbox, a planetary gear system, or another type of transmission. Transmission 48 may be a fixed ratio transmission that includes a plurality of gear ratios to allow engine 10 to rotate at a different speed than wheels 47. By changing a torque transfer capacity of first clutch 53 (e.g., an amount of clutch slippage), an amount of engine torque relayed to the wheels via powertrain shaft 84 may be modulated.

Electric machine 52 may be an HEV motor coupled in the drivetrain between the engine and the transmission. In still other examples, electric machine 52 may be a crankshaft integrated starter/generator (CISG). The CISG may be coupled to an output shaft of the engine so that during a startup of the hybrid vehicle system, the CISG may provide torque to turn the engine to facilitate startup of the engine. Under some conditions, the CISG may supply torque output to supplement or replace engine torque. Further, as elaborated herein, under some conditions, the CISG may supply negative torque output (that is, absorb driveline or engine torque) that may be converted into electric energy, such as for charging a system battery.

The powertrain may be configured in various manners, including as a parallel, a series, or a series-parallel hybrid vehicle. In electric vehicle embodiments, a system electrical energy device, such as system battery 45a may be coupled to the driveline. System battery 45a may be a traction battery, for example a 48V battery that delivers electrical power to electric machine 52 to provide torque to vehicle wheels 47. In some embodiments, electric machine 52 may also be operated as a generator to provide electrical power to charge system battery 45a, for example, during a braking operation using regenerative torque. It will be appreciated that in other embodiments, including non-electric vehicle embodiments, system battery 45a may be a typical starting, lighting, ignition (SLI) battery coupled to an alternator 46.

It will be appreciated that while the system electrical energy storage device 45a is depicted herein as a battery, in other examples, the electrical energy storage device 45a may be a capacitor.

In the depicted embodiment, engine 10 is a boosted engine configured with a boosting device, herein shown as turbocharger 15. Turbocharger 15 includes compressor 114 that is mechanically coupled to, and driven by, turbine 116 via a shaft 19, the turbine 116 driven by expanding engine exhaust. In one embodiment, the turbocharger may be a twin scroll device. In another embodiment, the turbocharger may be a variable geometry turbocharger (VGT), wherein turbine geometry is actively varied as a function of engine operating conditions. Turbocharger 15 may be further configured as an electrically assisted turbocharger having an electric motor 108 (herein also referred to as an electric assist motor) configured to provide electric assistance to the compressor, turbine, or turbocharger shaft. In the depicted example the electric motor 108 is coupled to shaft 19 although in other examples, the electric motor may be selectively coupled to the compressor 114 or the turbine 116. Electric motor 108 may be powered by an on-board energy storage device, such as system battery 45b (as shown, or to system battery 45a in an alternate example). Electric motor 108 may be additionally or alternatively powered by alternator 46. An amount of electrical power delivered to electric motor 108 may be varied in order to adjust a duty cycle of the turbocharger. In one example, the amount of electric power delivered to electric motor 108 may be increased to increase the speed of compressor 114. As a result of the electrical assistance, compressor 114 of turbocharger 15 may be rapidly spun up, reducing turbo lag.

It will be appreciated that while the depicted example shows the turbocharger as the boosting device, the turbocharger configured with electric assistance, this is not meant to be limiting. In still further examples, the engine may be a compound boosted engine system having an electrical supercharger (not shown) coupled upstream or downstream of the turbocharger in the engine intake. Therein, the supercharger may be the boosting device configured to receive electric assistance from electric motor 108 while turbocharger 15 may or may not be configured to receive electric assistance from electric motor 108. By spinning up the electric supercharger via the electric motor, a burst of boost pressure may be rapidly provided to the engine.

Electric motor 108 may be configured as a motor-generator. Thus, during conditions when electric assistance is required for boost build-up, the electric motor may provide positive torque (herein also referred to as motor torque) to drive either the centrifugal compressor of the supercharger, or the turbocharger shaft, to improve the transient boost pressure delivery. However, the electric motor is also capable of energy recuperation by "braking" the motor shaft. Therein, negative torque (herein also referred to as regenerative torque) may be applied to the compressor (or shaft or turbine), reducing the compressor speed and concurrently charging the system battery (such as battery 45b) coupled to the electric motor 108.

Fresh air is introduced along intake passage 42 into engine 10 via air box 112 and flows to compressor 114. Air is then compressed at compressor 114 and introduced into engine 10. Air compressed by turbocharger 15 may also be recirculated from downstream of the compressor 114 and downstream of a charge air cooler 18 to an inlet of compressor 114 through a compressor recirculation passage 60 by adjusting an opening of a continuously variable compressor recirculation valve (CCRV) 62. CCRV 62 may be a continuously variable valve and increasing the opening of the CCRV 62 may include actuating (or energizing) a motor or solenoid to open the valve. In alternate examples, compressor recirculation passage 60 may couple the compressor outlet, upstream of the CAC 18, to the inlet of compressor 114.

CCRV 62 may be a continuously variable valve wherein a position of the valve is continuously variable from a fully closed position to a fully open position. In some embodiments, CCRV 62 may be partially open during boosted engine operation to provide a surge margin. Herein, the partially open position may be a default valve position. Then, in response to an indication of surge, the opening of CCRV 62 may be increased. For example, CCRV 62 may be adjusted from the default, partially open position toward a fully open position, with a degree of opening based on the indication of surge (e.g., the compressor pressure ratio, the compressor flow rate, a pressure differential across the compressor, etc.). In alternate examples, CCRV 62 may be held closed during boosted engine operation (e.g., peak performance conditions) to decrease boost response time and increase peak performance.

Compressor 114 is coupled to a throttle valve 20 through a charge-air cooler (CAC) 18 (also referred to as an intercooler herein). Air flows from compressor 114 through CAC 18 and throttle valve 20 to an intake manifold 22. CAC 18 may be an air-to-air or water-to-air heat exchanger, for example. Intake manifold pressure (e.g., a pressure of the air charge within the intake manifold) may be determined using a manifold absolute pressure (MAP) sensor 124.

Intake manifold 22 is coupled to a series of combustion chambers 30 through a series of intake valves (not shown). The combustion chambers are further coupled to an exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted for the desired combustion and emissions-control performance. For example, the cam timing may be adjusted via a variable cam timing system to move the intake and exhaust cams to a position that provides the optimal volumetric efficiency for the given operating conditions.

Combustion chambers 30 may be supplied one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. In the depicted example, fuel is provided to each combustion chamber 30 via direct injection by a fuel injector 66 (while only one fuel injector is shown in FIG. 1, each combustion chamber includes a fuel injector coupled thereto). Fuel may be delivered to fuel injector 66 by a fuel system (not shown) including a fuel tank, a fuel pump, and a fuel rail. In the combustion chambers, combustion may be initiated via spark ignition and/or compression ignition.

As shown in FIG. 1, exhaust from exhaust manifold 36 is directed to turbine 116 to drive the turbine. When reduced turbine torque is desired, a portion of exhaust may be directed instead through a waste-gate 90, bypassing the turbine. A waste-gate actuator 92 (e.g., waste-gate valve) may be actuated open to relieve at least some exhaust pressure from upstream of turbine 116 to a location downstream of turbine 116 via waste-gate 90. By reducing exhaust pressure upstream of turbine 116, turbine speed may be reduced.

The combined flow from turbine 116 and waste-gate 90 flows through an emission control device 170. In general, emission control device 170 may include one or more exhaust after-treatment components configured to reduce an amount of one or more substances in the exhaust flow. For example, one exhaust after-treatment component may be configured to trap $NO_x$ from the exhaust flow when the exhaust flow is lean and to reduce the trapped $NO_x$ when the exhaust flow is rich. In other examples, an exhaust after-treatment component may be configured to disproportionate $NO_x$ or to selectively reduce $NO_x$ with the aid of a reducing agent. In still other examples, emission control device 170 includes a three-way catalyst configured to oxidize residual hydrocarbons and carbon monoxide while reducing $NO_x$ in the exhaust flow. Different exhaust after-treatment catalysts having any such functionality may be arranged in wash coats or elsewhere in emission control device 170, either separately or together. In some embodiments, the emission control device 170 may further include a regeneratable soot filter configured to trap and oxidize soot particles in the exhaust flow.

All or part of the treated exhaust from emission control device 170 may be released into the atmosphere via an exhaust conduit 35. Depending on operating conditions, however, some exhaust may be diverted instead to intake passage 42 via an exhaust gas recirculation (EGR) passage (not shown), including an EGR cooler and an EGR valve. EGR may be recirculated to the inlet of compressor 114.

One or more sensors may be coupled to the inlet of compressor 114. For example, a temperature sensor 55 may be coupled to the inlet of compressor 114 for estimating a compressor inlet temperature. As another example, a pressure sensor 56 may be coupled to the inlet of compressor 114 for estimating a pressure of air entering the compressor. Still other sensors may include, for example, air-fuel ratio sensors, humidity sensors, etc. In other examples, one or more of the compressor inlet conditions (such as humidity, temperature, pressure, etc.) may be inferred based on engine operating conditions. The sensors may estimate a condition of the intake air received at the compressor inlet from the intake passage as well as the air charge recirculated through passage 60. One or more sensors may also be coupled to intake passage 42 upstream of compressor 114 for determining a composition and condition of air charge entering the compressor. These sensors may include, for example, a pressure sensor 58. In addition, a throttle inlet pressure (TIP) sensor 59 may be coupled downstream of CAC 18 and upstream of throttle valve 20 for estimating a boost pressure delivered to the engine.

During an operator tip-in event, when going from engine operation without boost to engine operation with boost (that is, un-boosted to boosted tip-in) responsive to an increase in operator torque demand, turbo lag can occur. This is due to delays in turbine 116 spin-up due to the turbocharger inertia and reliance on exhaust energy to power the turbine. The same may also occur when the engine is operating boosted and there is a transient increase in boost demand due to an increase in accelerator pedal application by the vehicle operator (that is, boosted to boosted tip-in). To reduce this turbo lag, during those selected conditions, turbocharger 15 may be electrically assisted by receiving positive torque from electric motor 108. Specifically, responsive to the tip-in, waste-gate actuator 92 may be closed (e.g., fully closed) to increase exhaust flow through turbine 116. Before sufficient turbine power is available to turn the compressor at the speed needed to provide the required boost, the electric motor may increase power to the turbocharger shaft. When the turbine has sufficient pressure and flow from the exhaust gasses and the turbocharger is capable of providing the requested amount of boost, electric assistance to the turbocharger from electric motor 108 may be disabled. As elaborated with reference to FIG. 5, during a tip-in, the controller may determine when to disable the electric assist so as to reduce boost overshoot. In addition, based on the state of charge of the battery coupled to the motor, the controller may apply regenerative torque from the motor to reduce the boost overshoot. Alternatively, when a supercharger is included in the engine configuration, turbo lag may be reduced by electrically enabling the supercharger using positive torque received from electric motor 108. In particular, the faster-acting, electrically actuated supercharger compressor may be used to improve the transient boost response while the turbocharger spools up.

During an operator tip-out event, when going from engine operation with boost to engine operation without boost (that is, boosted to un-boosted tip-out), compressor surge may occur. This is due to a decreased flow through the compressor 114 when throttle valve 20 closes at the tip-out. The reduced forward flow through the compressor can cause surge and degrade turbocharger performance. In addition, surge can lead to noise, vibration, and harshness (NVH) issues such as undesirable noise from the engine intake system. To enable the torque demand to be rapidly reduced responsive to the tip-out without incurring compressor surge during a default mode of vehicle operation, at least a portion of the air charge compressed by compressor 114 may be recirculated to the compressor inlet. This allows sufficient flow through the compressor to continue while reduced flow is delivered to the intake manifold. In particular, CCRV 62 may be opened to recirculate (cool) compressed air from the outlet of compressor 114, downstream of CAC 18, to the inlet of compressor 114. In some embodiments, the compressor recirculation system may additionally or alternatively include a recirculation passage for recirculating warm compressed air from the compressor outlet, upstream of CAC 18, to the inlet of compressor 114. In addition, waste-gate actuator 92 may be moved to a more open (e.g., fully open) position so that more of the exhaust flow travels to the tailpipe while bypassing the turbine, thereby expediting turbine spin-down. As elaborated with reference to FIG. 2, a controller may coordinate the adjustments to a CCRV position with adjustments to a waste-gate position so as to improve the margin to surge while also providing the desired boost pressure. For example, an opening of both the CCRV and the waste-gate may be increased.

Also, during an operator tip-out event when going from an operating condition with boost to an operating condition with reduced boost (that is, boosted to boosted tip-out), compressor surge can occur due to reduced flow through the compressor. In cases when the new operating condition still requires boost, the CCRV can be opened a metered amount to allow sufficient flow through the compressor to avoid surge, but not so much as to reduce the boost pressure below the required pressure. The compressor may then be operating in a condition that requires more turbocharger shaft power. Fully closing the waste-gate may allow the turbine to provide as much power as possible. If the maximum available turbine power is insufficient to maintain the compressor operating point, the electric motor may be enabled to provide additional power to the turbocharger shaft. This allows a surge margin to be improved while also allowing the requested boost pressure to be delivered.

Compressor surge can also occur during a tip-in due to a combination of relatively high pressure ratio and relatively low flow rate through the compressor which causes it to operate in the surge region. This can occur during fast transients when the electric motor accelerates the turbocharger quickly. As elaborated with reference to FIG. 2, during such conditions, a controller may coordinate the adjustments to a CCRV position with adjustments to the power provided by the electric motor and a waste-gate position so as to improve the margin to surge while also providing the desired boost pressure. Coordinated control with CCRV is advantageous to using the motor and waste-gate alone due to the varying time scales of the three actuators. Specifically, pressure and flow respond very quickly to CCRV adjustments, while the response resulting from the motor and waste-gate adjustments occur on a slower time scale due to turbocharger inertia. Response to waste-gate may be even slower due to interaction with exhaust energy.

Controller 12 may be included in a control system 14. Controller 12 is shown receiving information from a plurality of sensors 16 (various examples of which are described herein) and sending control signals to a plurality of actuators 81 (various examples of which are described herein). As one example, sensors 16 may include an exhaust gas sensor 126 located upstream of turbine 116, MAP sensor 124, an exhaust temperature sensor 128, an exhaust pressure sensor 129, compressor inlet temperature sensor 55, compressor inlet pressure sensor 56 (e.g., for measuring Pi), a mass air flow (MAF) sensor 57, pressure sensor 58 and TIP sensor 59. Other sensors, such as additional pressure, temperature, air/fuel ratio, and composition sensors, may be coupled to various locations in vehicle system 100. In addition or in place of the depicted sensors, the controller may infer or model values for pressures, temperatures and/or flow rates based on operating conditions. The actuators 81 may include, for example, throttle valve 20, CCRV 62, electric motor 108, waste-gate actuator 92, and fuel injector 66. Controller 12 may receive input data from the various sensors, process the input data, and employ the various actuators to adjust engine operation based on the received signals and instructions stored on a memory of the controller. The controller may employ the actuators in response to the processed input data based on instruction or code programmed therein corresponding to one or more routines, such as example control routines described herein with regard to FIG. 2. As an example, responsive to an indication of tip-in surge at the intake compressor, as inferred from one or more of manifold flow, pedal position, compressor inlet pressure, and boost pressure, the controller may send a command signal to a waste-gate valve actuator to move the waste-gate valve to a more closed position while concurrently sending a command signal to the electric motor to increase compressor power and to a CCRV actuator to move the CCRV to a more open position.

In this way, the components of FIG. 1 enable a vehicle system comprising an engine; a turbocharger including an intake compressor coupled to an exhaust turbine via a shaft, and an electric motor coupled to the shaft for providing electric assistance to the turbocharger; a waste-gate including a waste-gate actuator coupled across the exhaust turbine of the turbocharger; a compressor bypass, including a continuously variable compressor recirculation valve, coupled across the intake compressor of the turbocharger; a pressure sensor coupled to the intake compressor downstream, of the compressor for estimating a pressure ratio across the compressor; and a controller for addressing issues associated with torque transients such as surge and boost overshoot.

For example, the controller may be configured with computer readable instructions stored on non-transitory memory for estimating a margin to a surge limit of the compressor during a torque transient responsive to input from the pressure sensor; and responsive to the margin being less than a threshold, increasing an opening of the compressor recirculation valve to increase the margin to above the threshold; and adjusting a power output by the electric motor based on a difference between actual boost pressure with the increased opening of the compressor recirculation valve and a target boost pressure based on the torque transient. For example, when the torque transient includes a boosted to boosted tip-out event, the CCRV opening may be increased by a smaller amount and the adjusted power output by the electric motor includes positive motor torque, and when the torque transient includes a boosted to un-boosted tip-out event, the opening may be increased by a larger amount and the adjusted power output by the electric motor includes regenerative motor torque. Further, when the torque transient includes a slower tip-in event, the CCRV opening may be increased by a smaller amount and the adjusted power output by the electric motor includes a smaller amount of positive motor torque, while when the torque transient includes a faster tip-in event, the opening may be increased by a larger amount and the adjusted power output by the electric motor includes a larger amount of positive motor torque. The controller may include further instructions for reducing an opening of the waste-gate actuator when the torque transient includes a boosted to boosted tip-out event or a tip-in event; and increasing the opening of the waste-gate actuator when the torque transient includes a boosted to un-boosted tip-out event.

Further still, the controller may include instructions for addressing boost overshoot. For example, during a heavy (boosted to boosted) tip-in event, the controller may provide positive motor torque from the electric motor for a duration until actual boost pressure is within a threshold of demanded boost pressure. Then, the controller may reduce boost overshoot by a first amount by increasing an opening of the compressor recirculation valve while further reducing the boost overshoot by a second amount by providing regenerative torque from the electric motor, the first amount relative to the second amount varied based on each of a predicted amount of boost pressure overshoot following the duration, and a state of charge of the battery. For example, when the state of charge of the battery is higher than a threshold, the first amount may be adjusted to be higher than the second amount, and when the state of charge of the battery is lower than the threshold, the second amount may be adjusted to be higher than the first amount. Further, the first amount relative to the second amount may be further adjusted based on a margin to surge at the tip-in event. The controller may include further instructions for predicting the margin to surge based on compressor flow with electric motor providing regenerative torque, and increasing the first amount as the margin to surge decreases. The controller may also include instructions for maintaining the waste-gate valve closed if the actual boost pressure is at or below the demanded boost pressure after increasing the opening of the CCRV and providing regenerative torque from the electric motor; and increasing an opening of the waste-gate valve if the actual boost pressure is above the demanded boost pressure after increasing the opening of the CCRV and providing regenerative torque from the electric motor. In this way, during the heavy tip-in event, the waste-gate may be moved to a closed position, the CCRV may be moved to a slightly open position, and the motor torque may be increased to provide a positive torque to the turbocharger. When the target boost pressure is reached, the CCRV may be quickly opened to a greater amount in order to avoid an overshoot of boost pressure. Simultaneously, the slower acting turbocharger may be controlled by reducing the electric motor torque possibly to a point of negative torque to the turbocharger, and by opening the wastegate. When the turbocharger approaches stable operation at the desired operating condition, the CCRV may be moved to a more closed position.

Figure 2:
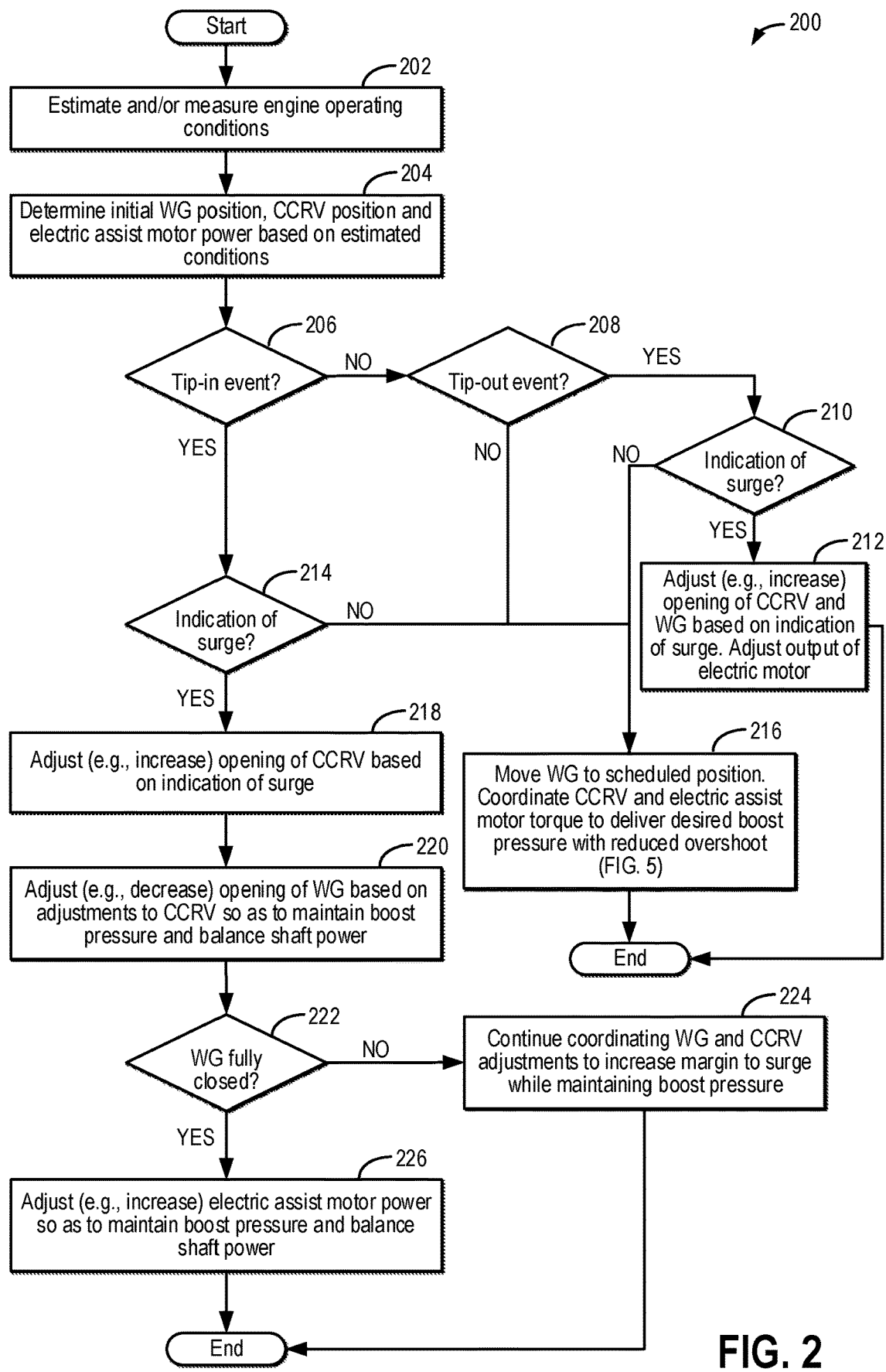
FIG. 2 depicts a high-level flow chart for addressing compressor surge by coordinating the actuation of a compressor recirculation valve with the actuation of an electric assist motor.

Turning now to FIG. 2, method 200 depicts an example routine for controlling a boosted engine having a boosting device configured to provide a boosted intake charge. In the depicted method, the boosted engine is a turbocharged engine. The method enables compressor surge to be addressed while leveraging coordinated actions between a waste-gate valve, a compressor recirculation valve, and an electric assist motor. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below. It will be appreciated that while the method of FIG. 2 is described with reference to a turbocharger, it is not meant to be limiting, and in other examples, the method may be applied to an engine having an alternate boosting device, such as an electric supercharger compressor coupled upstream or downstream of a turbocharger compressor, wherein the turbocharger is itself enabled with or without electric assist.

At 202, the method includes estimating and/or measuring engine operating conditions. These include, for example, operator torque demand, engine speed, a battery state of charge (SOC), ambient conditions such as ambient temperature, pressure, and humidity, MAF, MAP, etc.

At 204, the method includes determining an initial position for each of a waste-gate valve coupled to a waste-gate passage across an exhaust turbine, and a compressor recirculation valve (such as a continuously variable compressor recirculation valve, CCRV) coupled to an intake passage across an intake compressor. In addition, a power to be output by an electric assist motor coupled to the turbocharger (e.g., to the turbocharger shaft) may be determined. The determinations may be based on the estimated current operating conditions. As one example, as the operator torque demand increases, the desired boost pressure may increase. Accordingly, the controller may send a signal to move the waste-gate valve to a more closed position so that a larger portion of exhaust may flow through the turbine, spinning up the turbine. In addition, the controller may send a signal to move the CCRV to a more closed position so that flow recirculation is reduced and boost pressure increased. In addition, the waste-gate and CCRV adjustments may be coordinated with electric motor output adjustments to provide the desired boost pressure. Since the electric motor can provide power to the shaft independent of the turbine and the compressor, the coordinated torque from the electric motor and the turbine on the turbocharger shaft can spin the compressor at a speed required to provide the requested boost pressure. For example, if the boost pressure required to meet the torque demand is lower than a threshold, the controller may provide the desired boost pressure via adjustments to the waste-gate and CCRV only while providing no electric assist from the electric motor coupled to the turbocharger shaft. In another example, if the boost pressure required to meet the torque demand is higher than the threshold, the controller may provide the desired boost pressure via adjustments to the waste-gate and CCRV and while also providing electric assistance from the electric motor coupled to the turbocharger shaft. The threshold may be a non-zero positive threshold. Providing electric assistance from the electric motor may include the controller sending a control signal, such as a duty cycle signal, to the electric motor to spin the motor at a speed that provides an electric power corresponding to the requested electric assistance to the turbocharger shaft. The controller may refer to a look-up table, algorithm, or model which uses the desired boost pressure as an input and that provides a corresponding waste-gate valve position, CCRV position, and electric motor power as output. The controller may then command a signal to the corresponding actuators based on the determined valve positions and motor power.

Next, at 206, it may be determined if there is a tip-in event. In one example, a tip-in event may be confirmed if the operator torque demand increases by more than a threshold amount, increases at more than a threshold rate, and/or responsive to accelerator pedal depression. If a tip-in event is not confirmed, at 208, it may be determined if there is a tip-out event. In one example, a tip-out event may be confirmed if the operator torque demand decreases by more than a threshold amount, decreases at more than a threshold rate, and/or responsive to accelerator pedal release. In each case, the threshold is a non-zero positive threshold (rate, amount, etc.). If a tip-out event is confirmed, at 210, it may be determined if there is an indication of tip-out compressor surge. In one example, tip-out surge may occur due to a sudden drop in requested air flow through the compressor. As the throttle opening is decreased in response to the drop in torque demand at the tip-out, air flow through the compressor may decrease. As the air flow through the compressor drops, the compressor operating point moves closer to a surge limit (that is, there is a drop in the margin to the surge limit). In one example, tip-out surge may be indicated responsive to a reduction in estimated airflow indicative of a drop in the compressor's margin to a surge limit. Note that in some instances, surge may be a soft surge which exhibits objectionable whoosh noise from the compressor, but does not result in hard surge with violent noise pulses.

If there is no indication of tip-out compressor surge, then at 216, the method includes moving the WG and the CCRV to their scheduled positions (such as determined at 204), and setting the electric assist motor power to deliver the desired boost pressure. For example, if there is a decrease in the desired boost pressure, the CCRV may be maintained closed if there is sufficient surge margin and the WG may be moved to a more open position (e.g., fully open position). In addition, the electric assist motor power may be decreased (e.g., no electric assist power may be provided) or used as a generator to absorb excess torque from the turbocharger shaft (e.g., regenerative torque may be provided).

If there is an indication of tip-out compressor surge, then at 212, the method includes adjusting the motor torque and the CCRV based on the indication of surge. For example, the opening of the CCRV may be increased to provide sufficient surge margin. Since the response to waste-gate (WG) changes is slower than the onset of surge, during the motor torque and CCRV adjustment, the WG may be set at its scheduled position. It is appreciated however that alternatively the WG may be set to a fully open position. In one example, the CCRV may be moved to a more open position as the indication of surge increases (that is, as a margin to surge decreases). By opening the CCRV, recirculation flow may be increased resulting in increased forward flow through the compressor. Additionally opening the CCRV may lead to a reduction in boost pressure thereby reducing the pressure ratio across the compressor. Both the increased airflow and reduced pressure ratio may move the operating point to increase surge margin. In addition, the controller may operate the electric motor as a generator to absorb excess torque from the turbocharger shaft. Using the motor as a generator in this condition allows the shaft speed to be reduced more quickly than can be achieved by opening the WG. WG opening may be adjusted (either more open or more closed) to that required to achieve the desired boost at the conclusion of the tip-out.

For example, the controller may first operate the electric motor to absorb the excess torque from the turbocharger shaft so as to reduce boost pressure. At the same time, the controller may increase an opening of the CCRV to adjust the intake airflow and improve the compressor margin to surge. Once the compressor reaches the desired operating condition, the motor may be operated in a freewheeling manner and the CCRV may be closed. In another example, a tip-out may be from a boosted condition to a less boosted condition. The CCRV may be opened to increase recirculation flow and therefore forward flow through the compressor to maintain surge margin. In order to achieve the required boost pressure with additional compressor flow and with decreased exhaust flow, the WG may be moved in the closing direction. If the turbocharger shaft power from provided by the exhaust turbine is not sufficient to operate the compressor at the desired boost and flow condition, the electric motor may be operated to add torque to the turbo shaft. In this way, the combination of CCRV position, WG position, and electric motor operating condition may be set to provide the desired boost level and compressor flow rate to operate the engine at the driver requested torque without compressor surge.

Returning to 206, if a tip-in event is confirmed, at 214, it may be determined if there is an indication of tip-in compressor surge. Note that in some instances, surge may be a soft surge which exhibits objectionable whoosh noise from the compressor, but does not result in hard surge with violent noise pulses. In one example, tip-in surge may occur due to an increase in compressor pressure ratio without a sufficient increase in compressor flow rate. This may occur when the electric motor is used to produce rapid boost transients. For example, in response to an increase in torque demand, the WG may be closed, and the electric motor may be operated to increase the torque and speed of the turbocharger shaft. The increased speed of the shaft allows the compressor to generate higher boost pressure than would have been possible without the use of the electric motor. This higher boost pressure while the engine is still at a relatively low operating speed may reduce the surge margin or cause the compressor to operate in the surge region. In one example, tip-in surge may be indicated responsive to an increase in compressor outlet pressure indicative of a drop in the compressor's margin to a surge limit.

If there is no indication of tip-in compressor surge, then at 216, the method includes moving the WG to its scheduled position (such as determined at 204). Further, as elaborated at FIG. 5, the controller may coordinate adjusting the position of the CCRV and the motor torque (positive or negative) output by the electric assist motor to deliver the desired boost pressure while reducing boost pressure overshoot. For example, if there is an increase in the desired boost pressure, the CCRV may be moved to a partially open position that provides margin to tip-in surge while positive motor torque provided by the electric assist motor may be increased. Then, before the target boost pressure is reached (e.g., when at a threshold distance from the desired boost pressure), the positive motor torque may be disabled so that the target boost pressure can be reached via the inertia of the motor while the opening of the CCRV is increased. In addition, based on the system's ability to accept charge, such as based on the state of charge of a battery coupled to the electric assist motor, the controller may apply negative motor torque or regenerative torque on the compressor shaft to reduce boost overshoot. For example, when the battery SOC is lower than a threshold SOC (and is therefore capable of accepting charge), the motor may be operated as a generator and the CCRV opening may be adjusted based on the motor negative torque to maintain the boost pressure at the target pressure.

If there is an indication of tip-in compressor surge, then at 218, the method includes adjusting an opening of the CCRV based on the indication of surge. For example, the opening of the CCRV may be increased as the indication of surge increases. In one example, the opening of the CCRV may be increased so as to increase the air flow through the compressor to a threshold air flow required to move the compressor outside of a surge region of a compressor map. For example, the controller may use the existing pressure ratio and/or the margin to surge as an input, and may compute a target air flow desired across the compressor as an output. The controller may then further determine a CCRV position corresponding to the target air flow and send a control signal to an actuator of the CCRV to move the valve to the determined position (such as by moving the CCRV towards a more open position). By opening the CCRV, air flow may be recirculated from downstream of the compressor to upstream of the compressor, thereby increasing the forward flow through the compressor.

At 220, the method includes adjusting the opening of the waste-gate based on the adjustments to the CCRV so as to maintain boost pressure and balance shaft power. For example, the opening of the WG may be decreased as the opening of the CCRV is increased. By reducing the opening of the WG, more exhaust may be directed through the turbine, spinning up the turbine, and thereby increasing the compressor torque to meet the rise in boost pressure requested at the tip-in.

At 222, it may be determined if the WG has reached a limit, for example, if the WG has already become fully closed, or has been commanded fully closed. Once the WG is commanded fully closed, a further increase in boost pressure cannot be provided via adjustments to the CCRV and WG alone. If the WG is not commanded fully closed, then at 224, the controller may continue coordinating WG and CCRV adjustments to increase a margin to surge while maintaining boost pressure. For example, the controller may continue increasing an opening of the CCRV while decreasing the opening of the WG so as to move the compressor operating point further from the surge limit while providing the target boost pressure based on the increase in torque demand at the tip-in.

If the WG is fully closed or commanded fully closed but not yet achieved that position, then at 226, the controller may adjust the electric assist motor power so as to maintain boost pressure and balance shaft power. For example, the electric assist motor power may be increased by the controller sending a control signal indicative of a higher duty cycle to the electric assist motor. The inventors herein have recognized that during conditions of tip-in surge where there may be conflicting demands (such as a conflicting demand for an increase in margin to surge and an increase in torque demand), the combination of turbine power and electric motor power may be coordinated so as to provide a requested airflow to move the compressor further from the surge limit. Herein, the ability of the electric assist motor to provide a power to the turbocharger shaft, independent of the power provided to the shaft by the turbine, is advantageously leveraged for air flow control during surge. In particular, while the CCRV is opened by a metered amount to ensure the target air flow through the compressor moves away from the surge region of the compressor map, the electric assist motor may be operated to provide a power to the turbocharger shaft that spins the compressor at a speed that provides the desired boost level while flowing sufficient air to address surge. As an example, the controller may estimate an increase in air flow required to increase the compressor margin to surge (e.g., based on an engine airflow, compressor inlet pressure, boost pressure, etc.). The controller may then increase an opening of the CCRV from a current position based on a difference between the compressor inlet airflow at the current CCRV position relative to the desired airflow. Then the controller may estimate the electric motor torque required to be added to turbine torque in order to operate the compressor at the condition that will deliver the anticipated airflow and boost pressure. For example, in response to an increase in engine torque demand, the controller may use look-up tables or an air flow meter to estimate airflow and determine if that airflow will likely result in compressor surge. The controller may increase the opening of the CCRV and fully close the WG while at the same time increasing power to the turbo assist motor to operate the compressor to achieve an operating point that provides the required boost and surge margin.

In one example, the WG may be moved to a fully open position (or scheduled position) responsive to the indication of tip-out surge and moved to a fully closed position responsive to the indication of tip-in surge. In other examples, the amount of opening of the CCRV and the WG may be selected based on engine operating conditions including engine speed and the size of the tip-in or tip-out.

As a result, WG, CCRV, and electric assist motor adjustments may be coordinated so as to provide a target airflow that moves a compressor operating point away from a surge region of a compressor map, and improves the margin to surge. At the same time, a target boost pressure can be provided irrespective of whether the surge was caused due to a rise or drop in demanded torque.

In this way, responsive to an indication of tip-in surge, a controller may increase a margin to surge while concurrently maintaining boost pressure at a level based on driver demand via adjustments to each of an output of an electric motor coupled to a turbocharger shaft and an opening of a compressor recirculation valve coupled across an intake compressor. Herein, increasing the margin while maintaining boost pressure includes increasing the output of the electric motor coupled to the turbocharger shaft while increasing an opening of the compressor recirculation valve. In one example, the opening of the compressor recirculation valve is increased to increase an air flow through an intake compressor of the turbocharger, the air flow increased as the margin to surge decreases. The output of the electric motor may be increased as a difference between a target boost pressure based on the driver demand and an actual boost pressure with the increased opening of the compressor recirculation valve increases. In one example, increasing the output of the electric motor includes supplying positive motor torque from the electric motor to the turbocharger shaft. Further, the controller may reduce an opening of a waste-gate valve coupled across an exhaust turbine of the turbocharger as the difference between the target boost pressure based on the driver demand and the actual boost pressure with the increased opening of the compressor recirculation valve increases. Further still, responsive to an indication of tip-out surge, the controller may decrease the output of the electric motor while increasing the opening of the compressor recirculation valve. As an example, decreasing the output of the electric motor includes supplying negative motor torque, or regenerative torque, from the electric motor to the turbocharger shaft. The output of the electric motor may be decreased as the difference between the target boost pressure based on the driver demand and the actual boost pressure with the increased opening of the compressor recirculation valve increases. In some examples, the controller may also increase an opening of a waste-gate valve coupled across an exhaust turbine of the turbocharger as the difference between the target boost pressure based on the driver demand and the actual boost pressure with the increased opening of the compressor recirculation valve increases. In another example such as a boosted-to-boosted tip-out, the output of the electric motor may be increased as the difference between the target boost pressure based on the driver torque demand and the actual boost pressure with the increased opening of the compressor recirculation valve increases. Further, the controller may reduce an opening of a waste-gate valve coupled across an exhaust turbine of the turbocharger as the difference between the target boost pressure based on the driver torque demand and the actual boost pressure with the increased opening of the compressor recirculation valve increases. As another example, the increasing the opening of the waste-gate valve responsive to the indication of tip-out surge may include fully opening the waste-gate valve while the reducing the opening of the waste-gate valve responsive to the indication of tip-in surge may include fully closing the waste-gate valve. In one example, a position of each of the waste-gate valve and the compressor recirculation valve may be continuously variable between a fully open position and a fully closed position.

Turning now to FIG. 3, map 300 depicts example coordinated adjustments between an electric assist, a CCRV, and a WG to improve boost pressure delivery and a margin to compressor surge. Map 300 depicts an engine torque request at plot 301, a margin to surge as achieved using the depicted strategy at plot 302, specifically in relation to a hard surge region and a soft surge region of a compressor map as well as a margin to surge in the absence of the strategy at plot 303. Map 300 further depicts the opening of an intake CCRV at plot 304, the power output by an electric assist motor at plot 306, the opening of an exhaust waste-gate (WG) valve at plot 308, and a boost pressure at plot 310. All plots are depicted over time along the x-axis.

Prior to t1, the engine may be operated at a steady torque (plot 301) with positive boost pressure (plot 310). At t1, a boosted-to-boosted tip-out occurs. In the absence of the strategy, the reduction in flow through the compressor would reduce surge margin to the point that surge would occur (dashed line of plot 303). In the depicted strategy, the controller reacts by opening the CCRV (plot 304) by a metered amount to maintain a surge margin that prevents surge from occurring (solid line of plot 302). The waste-gate is moved to a more open position to provide the compressor power needed at the still boosted, but less boosted, operating point. The electric assist motor is powered to provide additional shaft power to achieve the compressor power required to deliver the required boost pressure and flow including the flow that is recirculated through the CCRV. At t2, the waste-gate is positioned to deliver boost without electric assist and the boost pressure has reduced to the required level. The electric motor is no longer needed to assist the turbocharger and its power is decreased to zero. The engine torque request increases gradually between t2 and t3.

At t3, a full tip-out occurs (that is, from boosted to un-boosted conditions) and the torque request is substantially reduced, such as to an idling level 311. In the absence of the strategy, the surge margin would reduce significantly and the compressor would operate in the hard surge region. In the depicted strategy, the controller opens the CCRV a large amount to avoid hard surge. The open CCRV quickly reduces boost pressure. The waste-gate is fully opened to reduce turbocharger speed and boost pressure. The electric motor power is reduced to a negative value causing the motor to act as a generator and absorb energy from the turbocharger shaft, further reducing its speed. The increasing negative value of the electric power represents use of regenerative torque for reducing the turbocharger speed. Specifically, as more regenerative torque is applied, the electric motor torque value becomes increasingly negative, and moves further away from the zero value. Once the turbocharger speed has been sufficiently reduced at t4, the CCRV is closed and the electric motor is returned to zero power, disabling the application of regenerative torque.

At t5, a slow tip-in occurs as indicated by the gradual increase in torque request. The waste-gate closes to increase boost while the CCRV remains closed. The electric assist motor is not needed. At t6, a fast tip-in occurs with a rapid increase in torque request. The electric motor is powered to provide the required boost. The CCRV is opened to provide sufficient airflow through the compressor to avoid the soft surge region. At t7, engine speed has increased and airflow consumed by the engine has increased so that additional flow from the CCRV can be reduced. Also at t7, the turbine power has increased to the point that electric motor power is no longer needed to provide the required boost.

Now turning to compressor map 400 of FIG. 4, the map depicts reduction of a pressure ratio across a turbocharger compressor by coordinating the operation of a compressor recirculation valve with adjustments to boost assist provided by an electric motor coupled to a turbocharger shaft. Map 400 shows compressor pressure ratio (along the y-axis) at different compressor flow rates (along the x-axis) for a turbocharger compressor having an electric motor coupled to its shaft. Line 402 (solid) shows a hard surge limit for the turbocharger compressor while line 404 (dashed) shows a soft surge limit for the compressor. Solid lines 406 (only 1 is labeled) depict the constant speed lines of the turbocharger compressor. Compressor operation at flow rates lower than the hard surge limit 402 results in turbocharger compressor operation in a hard surge region while compressor operation at flow rates lower than the soft surge limit 404 and higher than the hard surge limit 402 results in turbocharger operation in a soft surge region. Compressor operation in the hard surge region results in poor drivability, objectionable NVH, and potential degradation of engine performance.

A first tip-out trajectory is depicted at plot 408 (small dashed line) wherein no action is taken to prevent surge responsive to the tip-out. Therein, following the tip-out, the compressor flow initially drops into the soft surge region, before passing through the hard surge. Herein the compressor may spend a significant amount of time in the hard or soft surge region, resulting in significant NVH and drivability issues.

A second tip-out trajectory is depicted at plot 410 (medium dashed line) wherein surge is controlled only by operating the motor controlled to the shaft. Therein, following the tip-out, the CCRV is maintained closed while the motor is used to apply negative or regenerative torque on the shaft, causing the turbo speed to decrease. In this example, while hard surge is avoided, the response is not fast enough to avoid soft surge due to the large inertia of the turbocharger and high battery state of charge. As a result, the trajectory deviates from the desired trajectory that lies along the soft surge limit. Herein the compressor may spend some time in soft surge region before the flow is raised, resulting in some NVH and drivability issues.

A third tip-out trajectory is depicted at plot 414 (large dashed line) wherein surge is controlled by coordinating the opening of the CCRV with the operating of the electric motor. Herein, following the tip-out, the CCRV is opened to a more open position to maintain a trajectory to the right of the soft surge line. The open CCRV quickly reduces boost pressure and increases compressor forward flow. The electric motor is initially operated as a generator to provide negative torque so that energy from the turbocharger shaft can be absorbed, and the compressor speed can be rapidly reduced. Once battery state of charge becomes high the regeneration is disabled. The combined actions of the CCRV and motor allows the compressor to operate with the desired pressure ratio while flowing enough air to avoid soft surge. As a result, the trajectory largely follows the desired trajectory, averting NVH and drivability issues.

Figure 5:
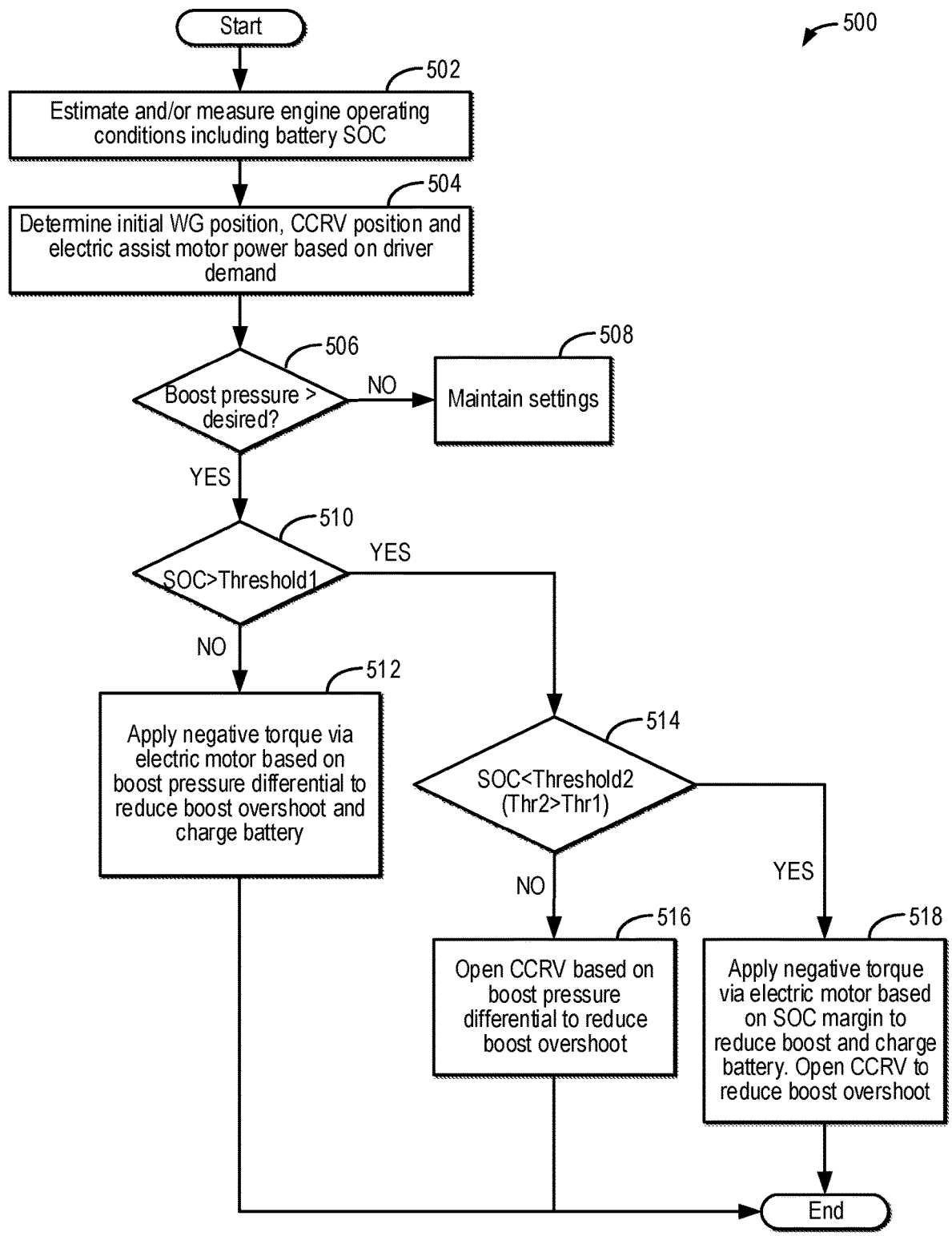
FIG. 5 depicts a high-level flow chart of an example method for improving boost pressure control by coordinating the actuation of a compressor recirculation valve with the actuation of an electric assist motor.

Turning now to FIG. 5, an example method 500 is shown for coordinating the operation of a CCRV with the electric assist provided by an electric motor coupled to a turbocharger to reduce boost pressure overshoot. The method of FIG. 5 may be included in the boost control method of FIG. 2, such as at 216.

At 502, as at 202, the method includes estimating and/or measuring engine operating conditions. These include, for example, operator torque demand, engine speed, a battery state of charge (SOC), ambient conditions such as ambient temperature, pressure, and humidity, MAF, MAP, etc. At 504, as at 204, the method includes determining an initial position for each of the waste-gate, the CCRV, as well as an output power for the electric assist motor coupled to the turbocharger. The determinations may be based on the estimated current operating conditions including driver demanded torque. As one example, as the operator torque demand increases, the desired boost pressure may increase. Accordingly, the controller may send a signal to move the waste-gate valve (WG) to a more closed position so that a larger portion of exhaust may flow through the turbine, spinning up the turbine. In addition, the controller may send a signal to move the CCRV to a more closed position to reduce the amount of compressed air that is allowed to flow back toward the compressor inlet. In addition, the waste-gate and CCRV adjustments may be coordinated with electric motor output adjustments to provide the desired boost pressure. Since the electric motor can provide power to the shaft independent of the turbine and the compressor, the coordinated torque from the electric motor and the turbine on the turbocharger shaft can spin the compressor at a speed required to provide the requested boost pressure. For example, if the boost pressure required to meet the torque demand is lower than a threshold, the controller may provide the desired boost pressure via adjustments to the waste-gate and CCRV only while providing no electric assist from the electric motor coupled to the turbocharger shaft. In another example, if the boost pressure required to meet the torque demand is higher than the threshold, the controller may provide the desired boost pressure via adjustments to the waste-gate and CCRV and while also providing electric assistance from the electric motor coupled to the turbocharger shaft. The threshold may be a non-zero positive threshold. Providing electric assistance from the electric motor may include the controller sending a control signal, such as a duty cycle signal, to the electric motor to spin the motor at a speed that provides an electric power corresponding to the requested electric assistance to the turbocharger shaft. The controller may refer to a look-up table, algorithm, or model which uses the desired boost pressure as an input and that provides a corresponding waste-gate valve position, CRV position, and electric motor power as output. The controller may then command a signal to the corresponding actuators based on the determined valve positions and motor power.

At 506, the method includes determining if the actual boost pressure is higher than the desired boost pressure. If the actual boost pressure is higher than desired, a boost pressure overshoot condition is confirmed. The desired boost pressure may be based on the driver demand while the actual boost pressure may be inferred or measured via a pressure sensor, such as a throttle inlet pressure (TIP) sensor. In one example, at 506 it may be determined if boost overshoot has occurred, while in other examples, it may be predicted whether boost pressure overshoot is expected (based on a projection of the current settings). If the actual boost pressure is not higher than desired, then at 508, the method includes maintaining settings for the CCRV, waste-gate, and electric assist motor.

If boost overshoot is confirmed, then at 510, it may be determined if the battery SOC is higher than a first threshold (Threshold1 or Thr1). Herein the battery is an energy storage device coupled to the electric motor. In alternate examples, the charge accepting ability of any other energy storage device coupled to the electric motor may be determined. The threshold may be a positive non-zero threshold and when the battery SOC is below it, the battery is capable of accepting a significant amount of charge. As an example, Thr1 may be computed as maximum possible SOC for current battery conditions minus charge that is produced by negative motor torque to eliminate boost differential. If the system is capable of accepting charge (such as when the battery SOC is less than 30%), then at 512, the method includes applying negative, or regenerative, torque via the electric motor based on the boost pressure differential to reduce boost overshoot while charging the battery. At the same time, the position of the waste-gate and CCRV may be maintained. For example, both the waste-gate and the CCRV may be maintained closed or almost closed so that the turbocharger compressor can continue to provide the boost demand while the electric motor absorbs the excess boost. In another example, if the negative torque provided via the electric motor is at a limit (such as when the battery cannot accept any further charge) and there is still some boost overshoot, the CCRV may be opened by an amount based on the remaining overshoot while maintaining the waste-gate closed to continue providing sufficient boost pressure.

If the battery SOC is higher than the first threshold, then it may be determined if the battery SOC is also higher than a second threshold (Threshold2 or Thr2), higher than the first threshold at 514. As an example, Thr2 may be 80% SOC. When the battery SOC is above Thr2, the battery is not capable of accepting of charge. When the battery SOC is below Thr2, the battery is capable of accepting some charge, but smaller than the amount of charge that could be accepted at 512. Alternatively, at 514 it may be determined if the battery can accept any charge. If the system is capable of accepting any charge (such as when the battery SOC is less than 80%), at 518, the method includes applying negative or regenerative torque via the electric motor based on the SOC margin to reduce boost and charge the battery. That is, the regenerative torque output by the motor may be limited based on the limited charge accepting potential of the battery (at the higher SOC) and the battery may be charged accordingly. Then the boost pressure differential may be addressed via opening the CCRV. Specifically, boost overshoot remaining after operating the electric motor with the regenerative torque is addressed by increasing the opening of the CCRV as a function of the remaining overshoot. At the same time, the waste-gate is maintained closed to allow boosted engine performance to remain elevated.

Returning to 514, if the battery SOC is above Thr2, and therefore is unable to accept charge, then in view of the limited charging potential of the battery, at 516, boost pressure overshoot is addressed by opening the CCRV as a function of the boost overshoot.

In this way, the regenerative torque output by the electric assist motor may be coordinated with the opening of the CCRV in view of the charge accepting potential of the system battery so as to reduce boost pressure overshoot without degrading boosted engine performance.

An example of reducing boost pressure overshoot via the coordination of the CCRV and the electric motor torque is shown with reference to map 600 of FIG. 6. Map 600 depicts Boost pressure along the y-axis and time along the x-axis. The actual boost pressure response achieved via the above-discussed strategy is shown at plot 602. A boost pressure response in the absence of the current strategy is shown at plot 604. A de-tuned boost pressure response is shown at plot 606.

Prior to t1, due to an increase in torque demand, the engine is operating boosted. Specifically, the engine is operated with electric boost assist including positive motor torque from the electric motor coupled to the compressor so as to raise the boost pressure to the desired level. At t1, once the actual boost pressure is at or within a threshold of the desired boost level, the electric motor is disabled. If the boost pressure is controlled aggressively via the electric assist motor and closed waste-gate to achieve a fast response, due to the inertia of the turbocharger, the actual boost pressure can overshoot the desired pressure after the motor is disabled, as shown at plot 604. On the other hand, if the response of the electric motor is detuned to reduce boost pressure overshoot, the actual boost pressure may reach the desired level slowly, as shown at plot 606, with a slow boost performance which may make the engine appear sluggish.

In the depicted strategy, instead of turning off the motor at t1, the operation of the CCRV and the motor is coordinated so as to reduce the boost pressure overshoot while providing an actual boost profile 602 that matches the desired boost profile. Specifically, between t1 and t2, if battery state of charge is below a threshold, the CCRV may be held closed to allow for improved boost response, while negative torque is applied from the electric motor as a function of the excess boost. Then at t2, once the boost overshoot is addressed, the motor may be disabled. Alternatively if battery state of charge is above a threshold, the motor may remain off and the CCRV may be opened between t1 and t2 as a function of excess boost.

Turning now to FIG. 7, map 700 depicts example coordinated adjustments between an electric assist provided by an electric motor, a CCRV, and a WG to improve boost pressure delivery and a margin to compressor surge. Map 700 depicts an engine torque request at plot 701, a margin to surge as achieved using the depicted strategy at plot 702, specifically in relation to a hard surge region and a soft surge region of a compressor map as well as a margin to surge in the absence of the strategy at plot 703. Map 700 further depicts the opening of an intake CCRV at plot 704, the power output by an electric assist motor at plot 706, the opening of an exhaust waste-gate (WG) valve at plot 708, a boost pressure at plot 710, and the state of charge (SOC) of a battery coupled to the electric assist motor at plot 712. All plots are depicted over time along the x-axis.

Prior to t1, the engine may be operated at a steady low level of torque (plot 701) with a low amount of positive boost pressure (plot 710). At t1, a boosted-to-boosted tip-in occurs. The WG (plot 708) is reduced to spool up the turbocharger and increase the boost pressure output. While the turbine and compressor of the turbocharger spool up, the transient increase in boost demand is met by providing electric assistance from the electric motor in the form of positive motor torque (plot 706). In particular, the motor is operated for a duration from t1 to t2 and then once the boost pressure is within a threshold of the demanded boost pressure, the motor may be deactivated and no further electric assist is provided.

However, due to the inertia of the turbocharger, even after the motor is switched off, there is a possibility of boost overshoot (dashed plot 711). In addition, the greater than desired boost pressure can cause tip-in surge (plot 703). To address the boost overshoot and the surge, coordinated adjustments are made between the CCRV and the electric assist. The adjustments are based on the ability of the electric motor to accept charge, as inferred from the battery's SOC. At t2, due to the battery having a lower SOC (plot 712), and therefore a higher charge accepting ability, a larger portion of the boost overshoot is addressed by providing negative, regenerative torque from the motor to the turbocharger shaft. As shown, the amount of regenerative torque provided in increased, which result in an increasing negative torque that is further away from the zero torque level in the negative direction. At the same time, a smaller portion of the boost overshoot is addressed by increasing the opening of the CCRV. While the negative torque from the motor addresses the boost overshoot, the CCRV opening is opened by a small amount to improve the compressor's margin to surge while operating with the negative torque. By only increasing the opening of the CCRV by a small amount, and maintaining the WG more closed, the boost pressure can be maintained elevated enough to meet the torque demand.

At t3, there is a boosted to boosted tip-out. In the absence of the coordinated adjustments, the reduction in flow through the compressor would reduce surge margin to the point that surge would occur (dashed line of plot 703). In the depicted strategy, the controller reacts by opening the CCRV by a metered amount to maintain a surge margin that prevents surge from occurring. The waste-gate is moved to more open position to provide the compressor power needed at the still boosted operating point. The electric assist motor is powered to provide additional shaft power to achieve the compressor power required to deliver the required boost pressure and flow including the flow that is recirculated through the CCRV. At t4, the boost pressure has reduced to the required level. The CCRV is closed because the surge margin is sufficient without recirculating airflow. The electric motor is no longer needed to assist the turbocharger and its power is decreased to zero.

Between t4 and t5, torque level is steady. The wastegate and CCRV opening is maintained. The motor is kept disabled. At t5, another boosted-to-boosted tip-in occurs. The opening of the WG is reduced to spool up the turbocharger and increase the boost pressure output. While the turbine and compressor of the turbocharger spool up, the transient increase in boost demand is met by providing electric assistance from the electric motor in the form of positive motor torque (plot 706). In particular, the motor is operated for a duration from t5 to t6 and then once the boost pressure is within a threshold of the demanded boost pressure, the motor may be deactivated and no further electric assist is provided. During the tip-in, the CCRV is opened to prevent soft surge of the compressor.

However, due to the inertia of the turbocharger, even after the motor is switched off, there is a possibility of boost overshoot. To address the boost overshoot and the surge, coordinated adjustments are made between the CCRV and the electric assist. The adjustments are based on the ability of the electric motor to accept charge, as inferred from the battery's SOC. At t6, due to the battery having a higher SOC, and therefore a lower charge accepting ability, a larger portion of the boost overshoot is addressed by opening the CCRV while addressing a remaining, smaller portion of the boost overshoot using regenerative torque from the motor to the turbocharger shaft. At the same time, a smaller portion of the boost overshoot is addressed by increasing the opening of the CCRV. In particular, the regenerative torque from the motor is adjusted based on the limited ability of the battery to accept charge, and the CCRV opening is opened by a larger amount to address the remainder of the boost overshoot and improve the compressor's margin to surge. By increasing the opening of the CCRV by a larger amount when the battery SOC is higher, and maintaining the WG closed, the boost pressure can be maintained elevated enough to meet the torque demand while addressing the boost overshoot.

At t7, there is a boosted to unboosted tip-out. The controller reacts by opening the CCRV and the waste-gate while the motor is maintained disabled.

It will be appreciated that while the above routine is discussed with reference to an electrically turbocharged engine system, in other examples, the engine may be a staged boosted engine system having an electric supercharger compressor coupled in series with a turbocharger compressor (either upstream or downstream). Therein, opening the CCRV by a metered amount may increase the airflow to both the staged compressors. If no additional turbine power is available at the turbocharger, the turbocharger would tend to reduce a pressure ratio with the added air flow. In such a situation, the electric compressor may be given additional electric power to increase the pressure ratio, resulting in the same total pressure at the intake manifold. Since the turbocharger of the staged boosted engine system tends to experience higher airflow and lower pressure ratio, it would be less likely to surge.

In this way, the coordinated operation of a compressor recirculation valve, a waste-gate valve, and motor torque from an electric assist motor may be used to provide the required air flow to improve a margin to surge during torque transients, including during a tip-in and a tip-out. The technical effect of increasing the opening of the CCRV while increasing the output of the electric assist motor is that the CRV may be opened to a larger degree to provide rapid surge relief without incurring a sluggish engine response when the surge occurs during peak power demand. Further, the CCRV enables surge relief to be provided by holding a waste-gate more closed and/or closed for a longer duration. By enabling the desired airflow to be delivered via coordinated CCRV, electric assist motor, and WG adjustments, surge relief can be provided faster, reducing surge related NVH issues. Overall, boosted engine response and surge mitigation are improved. In addition, the coordinated operation of the compressor recirculation valve and the electric assist motor enables boost overshoot during a tip-in to be better addressed. By adjusting the proportion of the overboost that is addressed via CCRV opening relative to using negative torque from the motor as a function of a battery state of charge (SOC), boost overshoot can be addressed more efficiently, while also managing battery SOC.

In one example, a method comprises: responsive to an indication of surge following a tip-in or tip-out event, increasing a margin to surge while maintaining boost pressure at a level based on torque demand via adjustments to each of an output of an electric motor coupled to a boosting device and an opening of a continuously variable compressor recirculation valve (CCRV), the adjustments selected based on the torque demand following the tip-in or tip-out event. In the preceding example, additionally or optionally, when the torque demand following the tip-in or tip-out is higher than a threshold demand, the adjustments include increasing a positive torque output by the electric motor while increasing the opening of the CCRV, and when the torque demand following the tip-in or tip-out is lower than the threshold demand, the adjustments include increasing a regenerative torque output by the electric motor while increasing the opening of the CCRV. In any or all of the preceding examples, additionally or optionally, when the torque demand is higher than the threshold demand, the engine is operated boosted, and when the torque demand is lower than the threshold demand, the engine is operated with natural aspiration. In any or all of the preceding examples, additionally or optionally, the adjustments to each of the output of the electric motor and the CCRV are further based on a state of charge of a battery coupled to the electric motor. In any or all of the preceding examples, additionally or optionally, when the torque demand following the tip-in or tip-out is lower than the threshold demand, the regenerative torque output by the electric motor is increased by a larger amount as the state of charge of the battery decreases, and wherein the increasing the opening of the CCRV is adjusted based on the increasing the regenerative torque output by the electric motor. In any or all of the preceding examples, additionally or optionally, when the torque demand following the tip-in or the tip-out is higher than the threshold demand, the opening of the CCRV is based on the margin to surge while the positive torque output by the electric motor is based on a target boost pressure based on the torque demand relative to an actual boost pressure with the adjusted opening of the CCRV, and wherein when the torque demand following the tip-in or the tip-out is lower than the threshold demand, the opening of the CCRV is based on the margin to surge while the regenerative torque output by the electric motor is based on the target boost pressure based on the torque demand relative to the actual boost pressure with the adjusted opening of the CCRV. In any or all of the preceding examples, additionally or optionally, the opening of the CCRV is increased as the margin to surge decreases, wherein the positive torque output by the electric motor is increased as target boost pressure based on the torque demand exceeds the actual boost pressure with the adjusted opening of the CCRV, and wherein the regenerative torque output by the electric motor is increased as the actual boost pressure exceeds the target boost pressure based on the torque demand with the adjusted opening of the CCRV. In any or all of the preceding examples, additionally or optionally, the boosting device includes one of an electric supercharger and a turbocharger, wherein when the boosting device is the turbocharger, the electric motor is coupled to one of a shaft, an intake compressor, and an exhaust turbine of the turbocharger, wherein the opening of the compressor recirculation valve is increased to increase an air flow through the intake compressor of the turbocharger, and the method further comprising adjusting a position of a waste-gate valve coupled to the exhaust turbine based on the torque demand following the tip-in or tip-out event. In any or all of the preceding examples, additionally or optionally, the waste-gate valve is closed when torque demand following the tip-in or tip-out is higher than the threshold demand, and wherein the waste-gate valve is opened when torque demand following the tip-in or tip-out is lower than the threshold demand.

Another example method comprises: responsive to a first tip-out to boosted engine operation, opening a continuously variable compressor recirculation valve (CCRV) by a first amount while increasing a power output by an electric motor coupled to an intake compressor of a turbocharger; and responsive to a second tip-out to un-boosted engine operation, opening the CCRV by a second amount, larger than the first amount, while decreasing the power output by the electric motor. In the preceding example, additionally or optionally, increasing the power output by the electric motor includes providing positive motor torque from the electric motor to the compressor, and wherein decreasing the power output by the electric motor includes providing regenerative motor torque from the electric motor to the compressor. In any or all of the preceding examples, additionally or optionally, during the first tip-out, the first amount of opening of the CCRV is based on a margin to surge of the compressor and wherein the positive motor torque is based on torque demand following the first tip-out, and wherein during the second tip-out, the second amount of opening of the CCRV is based on the margin to surge of the compressor and wherein the regenerative motor torque is based on the torque demand following the second tip-out. In any or all of the preceding examples, additionally or optionally, during the first tip-out, the first amount is increased as the margin to surge decreases, and the positive motor torque is increased as a target boost pressure based on the torque demand following the first tip-out exceeds an actual boost pressure with the first amount of CCRV opening; and wherein during the second tip-out, the second amount is increased as the margin to surge decreases, and the regenerative motor torque is increased as the target boost pressure based on the torque demand following the second tip-out falls below the actual boost pressure with the second amount of opening. In any or all of the preceding examples, additionally or optionally, the method further comprises, during the first tip-out, reducing an opening of a waste-gate valve coupled to an exhaust turbine of the turbocharger, the opening reduced further as the target boost pressure exceeds the actual boost pressure with the first amount of CCRV opening, and wherein during the second tip-out, increasing the opening of the waste-gate valve, the opening increased further as the target boost pressure falls below the actual boost pressure with the second amount of CCRV opening. In any or all of the preceding examples, additionally or optionally, the method further comprises, following each of the first and second tip-out, when the actual boost pressure reaches the target boost pressure, closing the CCRV and disabling the electric motor. In any or all of the preceding examples, additionally or optionally, the method further comprises, responsive to a faster than threshold tip-in to boosted engine operation, opening the CCRV while increasing the power output by the electric motor, the opening of the CCRV based on the margin to surge, and the increasing the power.

Another example vehicle system comprises: an engine; a turbocharger including an intake compressor coupled to an exhaust turbine via a shaft, and an electric motor coupled to the shaft for providing electric assistance to the turbocharger; a waste-gate including a waste-gate actuator coupled across the exhaust turbine of the turbocharger; a compressor bypass, including a continuously variable compressor recirculation valve (CCRV), coupled across the intake compressor of the turbocharger; a pressure sensor coupled to the intake system downstream of the compressor for estimating a pressure ratio across the compressor; and a controller with computer readable instructions stored on non-transitory memory for: estimating a margin to a surge limit of the compressor during a torque transient responsive to input from the pressure sensor; and responsive to the margin being less than a threshold, increasing an opening of the CCRV to increase the margin to above the threshold; and adjusting a power output by the electric motor based on a difference between actual boost pressure with the increased opening of the CCRV and a target boost pressure based on the torque transient. In the preceding example, additionally or optionally, when the torque transient includes a boosted to boosted tip-out event, the CCRV opening is increased by a smaller amount and the adjusted power output by the electric motor includes positive motor torque, wherein when the torque transient includes a boosted to un-boosted tip-out event, the CCRV opening is increased by a larger amount and the adjusted power output by the electric motor includes regenerative motor torque. In any or all of the preceding examples, additionally or optionally, when the torque transient includes a slower tip-in event, the CCRV opening is increased by a smaller amount and the adjusted power output by the electric motor includes a smaller amount of positive motor torque, and wherein when the torque transient includes a faster tip-in event, the CCRV opening is increased by a larger amount and the adjusted power output by the electric motor includes a larger amount of positive motor torque. In any or all of the preceding examples, additionally or optionally, the controller includes further instructions for: reducing an opening of the waste-gate actuator when the torque transient includes a boosted to boosted tip-out event or a tip-in event; and increasing the opening of the waste-gate actuator when the torque transient includes a boosted to un-boosted tip-out event.

Another example method comprises: responsive to predicted boost overshoot, adjusting each of a regenerative torque output by an electric motor coupled to a boosting device and an opening of a continuously variable compressor recirculation valve (CCRV), the adjusting based on a state of charge (SOC) of a battery coupled to the electric motor. In the preceding example, additionally or optionally, the method further comprises predicting the boost overshoot following an increase in torque demand wherein positive torque is output by the electric motor. In any or all of the preceding examples, additionally or optionally, the adjusting includes increasing the regenerative torque output by the electric motor as the state of charge of the battery decreases at a time of the predicted boost overshoot, while increasing the opening of the CCRV as the regenerative torque output by the electric motor decreases. In any or all of the preceding examples, additionally or optionally, the adjusting includes: when the state of charge of the battery is lower, increasing the regenerative torque output by the electric motor as a function of a boost pressure differential of the predicted boost overshoot, and increasing the opening of the CCRV as a margin to surge of the compressor operating with the regenerative torque output applied via the electric motor decreases; and when the state of charge of the battery is higher, increasing the opening of the CCRV as the boost pressure differential of the predicted boost overshoot increases, and increasing the regenerative torque output by the electric motor as the margin to surge of the compressor operating with the increased opening of the CCRV decreases. In any or all of the preceding examples, additionally or optionally, the boost pressure differential of the predicted boost overshoot includes a difference between a target boost pressure based on torque demand and actual boost pressure, and a rate of rise of the difference. In any or all of the preceding examples, additionally or optionally, the adjusting includes: when the SOC is lower than a first threshold, increasing the regenerative torque output by the electric motor while opening the CCRV by a first amount; when the SOC is higher than the first threshold but lower than a second threshold, increasing the regenerative torque output by the electric motor by a second amount smaller than the first amount, while opening the CCRV by a second amount, larger than the first amount; and when the SOC is higher than each of the first and the second threshold, disabling the electric motor while opening the CCRV by a third amount larger than the second amount, wherein the second threshold is higher than the first threshold. In any or all of the preceding examples, additionally or optionally, the boosting device includes one of an electric supercharger and a turbocharger, wherein when the boosting device is the turbocharger, the electric motor is coupled to one of a shaft, an intake compressor, and an exhaust turbine of the turbocharger, the method further comprising, maintaining a waste-gate valve coupled across the exhaust turbine closed during the adjusting. In any or all of the preceding examples, additionally or optionally, adjusting the opening of the CCRV includes adjusting the opening from an initial position based on the increase in torque demand. In any or all of the preceding examples, additionally or optionally, the boosting device is a turbocharger, wherein an intake compressor of the turbocharger is coupled to an exhaust turbine, the method further comprising, maintaining a waste-gate valve coupled across the exhaust turbine at a position based on the increase in torque demand during the adjusting.

Yet another example method for a boosted engine comprises: responsive to a first boost overshoot condition, increasing an opening of a continuously variable compressor recirculation valve (CCRV) while increasing a regenerative torque output by an electric motor coupled to an intake compressor of a boosting device; responsive to a second boost overshoot condition, maintaining the opening of the CCRV while increasing the regenerative torque output by the electric motor. In the preceding example, additionally or optionally, during each of the first and second boost overshoot condition, maintaining a higher than threshold margin of the compressor from a surge limit. In any or all of the preceding examples, additionally or optionally, during the first condition, a state of charge of a battery coupled to the electric motor is higher and during the second condition, the state of charge of the battery is lower. In any or all of the preceding examples, additionally or optionally, during the first condition, the increasing the regenerative torque output by the electric motor is based on a difference between the state of charge of the battery and a threshold state of charge, the regenerative torque increased further as the difference increases, and wherein the increasing the opening of the CCRV is based on an amount of boost overshoot remaining after operating with the increased regenerative torque, the opening of the CCRV increased further as the amount of boost overshoot increases. In any or all of the preceding examples, additionally or optionally, the method further comprises, during a third condition, where the state of charge of the battery is higher than the state of charge during each of the first and second condition, maintaining the electric motor disabled while increasing the opening of the CCRV based on an amount of boost overshoot. In any or all of the preceding examples, additionally or optionally, the boosting device is a turbocharger including a compressor coupled to an exhaust turbine, the method further comprising, during each of the first, second, and third condition, maintaining an exhaust waste-gate valve coupled across an exhaust turbine of the turbocharger closed.

Still another example vehicle system comprises: an engine; a turbocharger including an intake compressor coupled to an exhaust turbine via a shaft, and an electric motor coupled to the shaft for providing electric assistance to the turbocharger, the electric motor driven by a battery; a waste-gate including a waste-gate actuator coupled across the exhaust turbine of the turbocharger; a compressor bypass, including a continuously variable compressor recirculation valve (CCRV), coupled across the intake compressor of the turbocharger; and a controller with computer readable instructions stored on non-transitory memory for: responsive to a boosted to boosted tip-in event, providing positive motor torque from the electric motor for a duration until actual boost pressure is within a threshold of demanded boost pressure; and then, reducing boost overshoot by a first amount by increasing an opening of the compressor recirculation valve while further reducing the boost overshoot by a second amount by providing negative torque from the electric motor, the first amount relative to the second amount varied based on each of a predicted amount of boost pressure overshoot following the duration, and a state of charge of the battery. In any or all of the preceding examples, additionally or optionally, when the state of charge of the battery is higher than a threshold, the first amount is higher than the second amount, and when the state of charge of the battery is lower than the threshold, the second amount is higher than the first amount. In any or all of the preceding examples, additionally or optionally, the first amount relative to the second amount is further adjusted based on a margin to surge at the tip-in event. In any or all of the preceding examples, additionally or optionally, the further adjusting includes predicting the margin to surge based on compressor flow with electric motor providing negative torque, and increasing the first amount as the margin to surge increases. In any or all of the preceding examples, additionally or optionally, the controller includes further instructions for: maintaining the waste-gate valve closed if the actual boost pressure is at or below the demanded boost pressure after increasing the opening of the CCRV and providing negative torque from the electric motor; and increasing an opening of the waste-gate valve if the actual boost pressure is above the demanded boost pressure after increasing the opening of the CCRV and providing negative torque from the electric motor.

In a further representation, the engine is configured in a hybrid electric vehicle system. In still another further representation, the engine is configured in a vehicle that can be autonomously driven.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
responsive to a predicted boost overshoot,
adjusting each of a regenerative torque output by an electric motor coupled to a boosting device and
an opening of a continuously variable compressor recirculation valve (CCRV), the adjusting based on a state of charge (SOC) of a battery coupled to the electric motor.

2. The method of claim 1, further comprising, predicting the boost overshoot following an increase in torque demand wherein positive torque is output by the electric motor.

3. The method of claim 1, wherein the adjusting includes increasing the regenerative torque output by the electric motor as the state of charge of the battery decreases at a time of the predicted boost overshoot, while increasing the opening of the CCRV as the regenerative torque output by the electric motor decreases.

4. The method of claim 1, wherein the adjusting includes:
when the state of charge of the battery is lower, increasing the regenerative torque output by the electric motor as a function of a boost pressure differential of the predicted boost overshoot, and increasing the opening of the CCRV as a margin to surge of the compressor operating with the regenerative torque output applied via the electric motor decreases; and
when the state of charge of the battery is higher, increasing the opening of the CCRV as the boost pressure differential of the predicted boost overshoot increases, and increasing the regenerative torque output by the electric motor as the margin to surge of the compressor operating with the increased opening of the CCRV decreases.

5. The method of claim 4, wherein the boost pressure differential of the predicted boost overshoot includes a difference between a target boost pressure based on torque demand and actual boost pressure, and a rate of rise of the difference.

6. The method of claim 1, wherein the adjusting includes:
when the SOC is lower than a first threshold, increasing the regenerative torque output by the electric motor while opening the CCRV by a first amount;
when the SOC is higher than the first threshold but lower than a second threshold, increasing the regenerative torque output by the electric motor by a second amount smaller than the first amount, while opening the CCRV by a second amount, larger than the first amount; and
when the SOC is higher than each of the first and the second threshold, disabling the electric motor while opening the CCRV by a third amount larger than the second amount, wherein the second threshold is higher than the first threshold.

7. The method of claim 1, wherein the boosting device includes one of an electric supercharger and a turbocharger, wherein when the boosting device is the turbocharger, the electric motor is coupled to one of a shaft, an intake compressor, and an exhaust turbine of the turbocharger, the method further comprising, maintaining a waste-gate valve coupled across the exhaust turbine closed during the adjusting.

8. The method of claim 2, wherein adjusting the opening of the CCRV includes adjusting the opening from an initial position based on the increase in torque demand.

9. The method of claim 8, wherein the boosting device is a turbocharger, wherein an intake compressor of the turbocharger is coupled to an exhaust turbine, the method further comprising, maintaining a waste-gate valve coupled across the exhaust turbine at a position based on the increase in torque demand during the adjusting.

* * * * *